United States Patent [19]

Moser et al.

[11] Patent Number: 5,352,334
[45] Date of Patent: Oct. 4, 1994

[54] THE USE OF METAL-FREE SULFO GROUP FREE BASIC DISAZO COMPOUNDS CONTAINING TWO IDENTICAL 6-HYDROXYPYRID-2-ONE COUPLING COMPONENT RADICALS FOR PRODUCING COLORED PAPER

[75] Inventors: Helmut A. Moser, Oberwil, Switzerland; Roland Wald, Huningue, France

[73] Assignee: Sandoz Ltd., Basel, Switzerland

[21] Appl. No.: 981,740

[22] Filed: Nov. 25, 1992

Related U.S. Application Data

[60] Continuation of Ser. No. 709,849, Jun. 3, 1991, abandoned, which is a division of Ser. No. 75,368, Jul. 20, 1987, abandoned, which is a continuation-in-part of Ser. No. 845,097, Mar. 27, 1986, abandoned.

[30] Foreign Application Priority Data

Mar. 30, 1985 [DE] Fed. Rep. of Germany ....... 3511733

[51] Int. Cl.$^5$ .................. D21H 21/28; D21H 17/07; C09B 44/08; C09B 44/12
[52] U.S. Cl. ...................... 162/162; 8/919; 534/606; 534/607; 534/608; 534/609; 534/772
[58] Field of Search ............. 534/606, 607, 608, 609, 534/772; 162/162; 8/919

[56] References Cited

U.S. PATENT DOCUMENTS

| 4,079,052 | 3/1978 | Muller ..................... 534/759 X |
| 4,087,244 | 5/1978 | Greve et al. .................. 534/606 X |
| 4,213,897 | 7/1980 | Moser et al. .................. 534/606 |
| 4,591,635 | 5/1986 | Greve et al. .................. 534/606 X |
| 4,673,735 | 6/1987 | Moser et al. .................. 534/606 |
| 4,675,388 | 6/1987 | Greve et al. .................. 534/608 |

FOREIGN PATENT DOCUMENTS

| 0092520 | 10/1983 | European Pat. Off. ............ 534/606 |
| 2809601 | 9/1978 | Fed. Rep. of Germany ...... 534/606 |
| 58-101158 | 6/1983 | Japan . |
| 0601433 | 7/1978 | Switzerland . |
| 0628078 | 2/1982 | Switzerland . |
| 1285339 | 8/1972 | United Kingdom ................ 534/759 |
| 1296857 | 11/1972 | United Kingdom ................ 534/606 |
| 2076421 | 12/1981 | United Kingdom ................ 534/606 |
| 2104090 | 3/1983 | United Kingdom ................ 534/606 |

Primary Examiner—Floyd D. Higel
Attorney, Agent, or Firm—Robert S. Honor; Melvyn M. Kassenoff

[57] ABSTRACT

Metal-free compounds of the formula

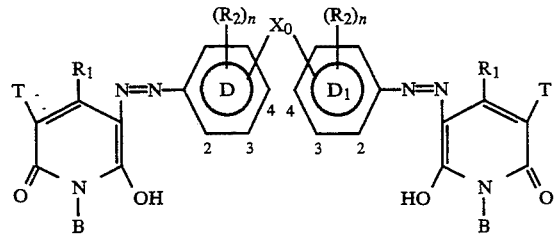

and 1:1 and 1:2 metal complexes thereof and acid addition salts of such metal-free compounds and 1:1 and 1:2 metal complexes, wherein
each B is $-A_1-NR_7R_8$ or $-A_1-{}^\oplus NR_7R_8R_9 A^\ominus$, the two B's being identical, wherein
each $A_1$ is linear or branched $C_{2-8}$alkylene,
each $R_1$ is hydrogen, $C_{1-4}$alkyl, $C_{5-6}$cycloalkyl, phenyl, benzyl or phenylethyl, the two $R_1$'s being identical,
each $R_2$ is independently halo, hydroxy, nitro, carboxy, $C_{1-4}$alkyl or $C_{1-4}$alkoxy,
each T is hydrogen, cyano, $-COOR_4$, $-CON(R_5)_2$, $-SO_2N(R_5)_2$,
the two T's being identical,

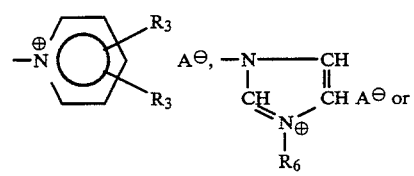

(Abstract continued on next page.)

-continued

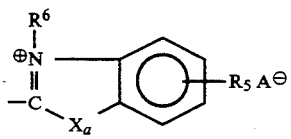

wherein
each $R_3$ is independently hydrogen, $C_{1-4}$alkyl, $-N(R_5)_2$ or $-CON(R_5)_2$,
each $R_4$ is $C_{1-6}$alkyl or phenyl($C_{1-3}$alkyl),
each $R_6$ is $C_{1-4}$alkyl, and
each $X_a$ is $-O-$, $-S-$ or $-NR_5-$, and $X_o$ is a direct bond or an organic bridging radical,
wherein
each $R_5$ is independently hydrogen or $C_{1-4}$alkyl, or $-N(R_5)_2$ is an unsubstituted saturated ring containing 1 to 3 hetero atoms or a saturated ring containing 1 to 3 hetero atoms and substituted by 1 to 3 $C_{1-4}$alkyl groups,
each $A^\ominus$ is a non-chromophoric anion, and $R_7$–$R_9$ are organic radicals, are useful as dye for paper, textiles and leather.

20 Claims, No Drawings

THE USE OF METAL-FREE SULFO GROUP FREE BASIC DISAZO COMPOUNDS CONTAINING TWO IDENTICAL 6-HYDROXYPYRID-2-ONE COUPLING COMPONENT RADICALS FOR PRODUCING COLORED PAPER

This is a continuation of application Ser. No. 07/709,849, filed Jun. 3, 1991 and now abandoned, which is a division of application Ser. No. 07/075,368, filed Jul. 20, 1987 and now abandoned, which is a continuation-in-part of application Ser. No. 06/845,097, filed Mar. 27, 1986 and now abandoned.

The invention relates to sulphonic acid group-free basic compounds useful for dyeing substrates such as paper, textiles and leather.

According to the invention there is provided 1:1 and 1:2 metal complexes of a compound in free base or acid addition salt form of formula I

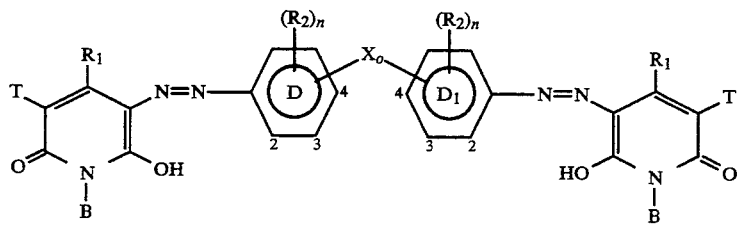

(I)

in which the $R_1$'s are identical and are hydrogen, $C_{1-4}$alkyl, $C_{5-6}$cycloalkyl, phenyl, benzyl or phenylethyl;

each n, independently, is 0, 1 or 2;

each $R_2$, independently, is hydrogen, halogen, hydroxy, nitro, —COOH, $C_{1-4}$alkyl or $C_{1-4}$alkoxy;

the T's are identical and are hydrogen —CN; —COOR$_4$; —CON(R$_5$)$_2$; —SO$_2$N(R$_5$)$_2$;

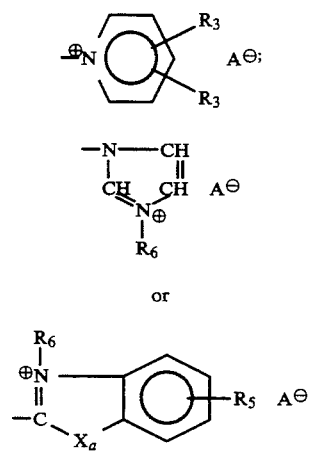

or the $X_a$'s are identical and are —O—, —S— or >N—R$_5$;

each $R_3$, independently, is hydrogen, $C_{1-4}$alkyl, —N(R$_5$)$_2$ or —CON(R$_5$)$_2$;

the $R_4$'s are identical and are $C_{1-6}$alkyl or phenyl-$C_{1-3}$alkyl;

each $R_5$, independently, is hydrogen or $C_{1-4}$alkyl; or when two $R_5$'s are attached to a nitrogen atom, both $R_5$'s together with the N-atom to which they are attached may form a saturated ring which contains one to three hetero atoms and is unsubstituted or substituted by one to three $C_{1-4}$alkyl groups;

the $R_6$'s are identical and are $C_{1-4}$alkyl;

the B's are identical and are —A$_1$—NR$_7$R$_8$ or —A$_1$—$^\oplus$NR$_7$R$_8$R$_9$ A$^\ominus$;

the $A_1$'s are identical and are $C_{2-8}$alkylene;

the $R_7$'s are identical and are $C_{1-6}$alkyl, $C_{2-6}$alkyl monosubstituted by halogen, hydroxy or cyano; phenyl($C_{1-3}$alkyl) the phenyl ring of which is unsubstituted or substituted by 1 to 3 groups selected from halogen, $C_{1-4}$alkyl and $C_{1-4}$alkoxy; or $C_{5-6}$cycloalkyl, unsubstituted or substituted by 1 to 3 $C_{1-4}$alkyl groups;

the $R_8$'s are identical and have one of the significances of $R_7$, independently, or $R_7$ and $R_8$ together with the N-atom to which they are attached form a saturated ring which contains one to three hetero atoms and is unsubstituted or substituted by one to three $C_{1-4}$alkyl groups or N'-aminoethylpiperazinium;

the $R_9$'s are identical and are $C_{1-4}$alkyl unsubstituted or substituted by phenyl, —CH$_2$COCH$_3$, —CH$_2$CONH$_2$ or —CH$_2$—CHOH—CH$_2$Cl;

or $R_7$, $R_8$, $R_9$ and the N-atom to which they are attached form a pyridinium group (attached by its N-atom) unsubstituted or substituted by one to three $C_{1-4}$alkyl groups, a saturated ring which contains one to three hetero atoms and is unsubstituted or substituted by one to three $C_{1-4}$alkyl groups or N—$C_{1-2}$alkyl-N'-aminoethylpiperazinium;

$X_o$, when all four groups $R_2$ are hydrogen, is selected from $X_1$ to $X_{63}$ and $X_{100}$ to $X_{109}$;

in which $X_1$ is a direct bond, $X_2$ is a linear or branched $C_{1-4}$alkylene radical,

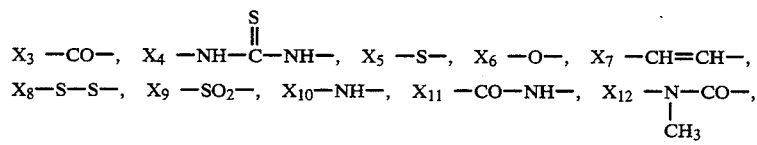

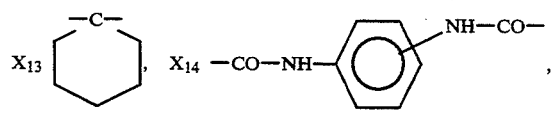

-continued
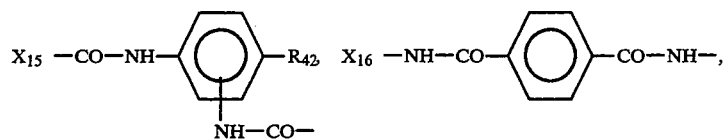
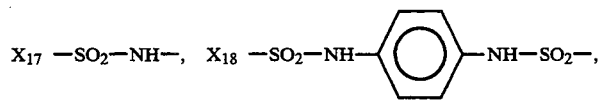
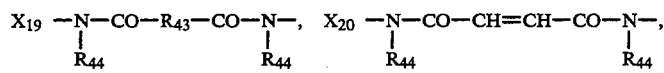
$X_{21}$ 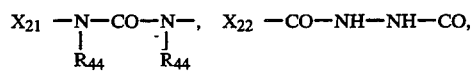, $X_{22}$ —CO—NH—NH—CO,
$X_{23}$ —CH$_2$CO—NH—NH—CO—CH$_2$—,
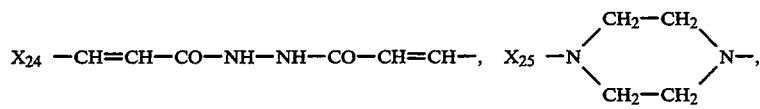
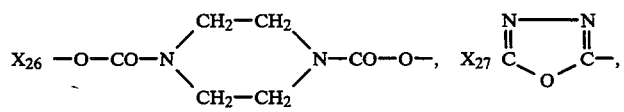
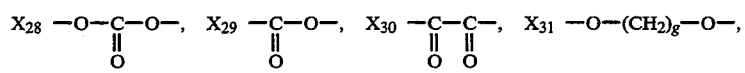
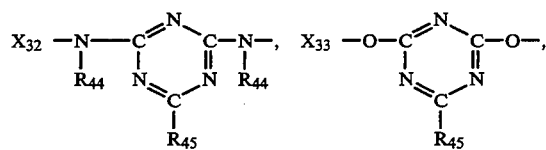
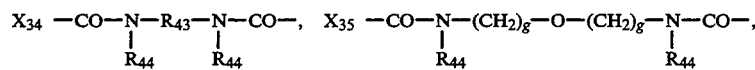
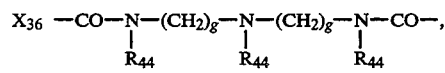
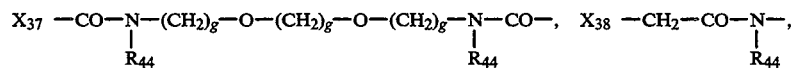
$X_{39}$ 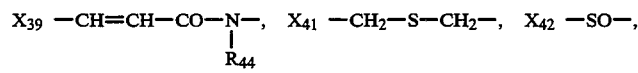, $X_{41}$ —CH$_2$—S—CH$_2$—, $X_{42}$ —SO—,
$X_{43}$ —CH$_2$—SO—CH$_2$—, $X_{44}$ —CH$_2$—SO$_2$—CH$_2$—,
$X_{45}$ —CH$_2$—NH—CO—NH—CH$_2$—, $X_{46}$ —CH$_2$—NH—CS—NH—CH$_2$—,
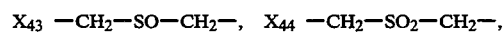
$X_{49}$ —CH$_2$—CO—CH$_2$—, $X_{50}$ —CH=CH—CH=CH—,
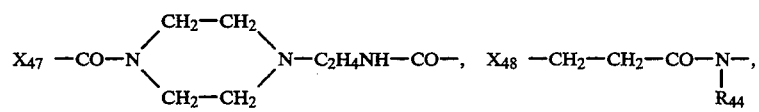
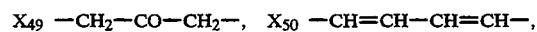
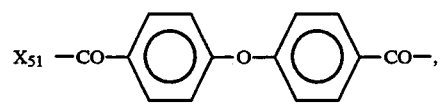

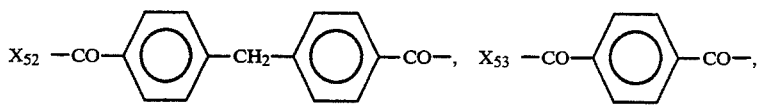

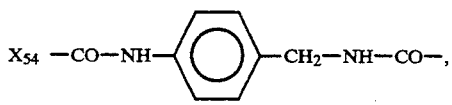

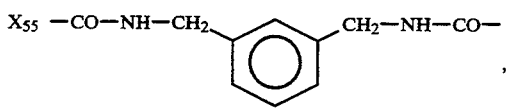

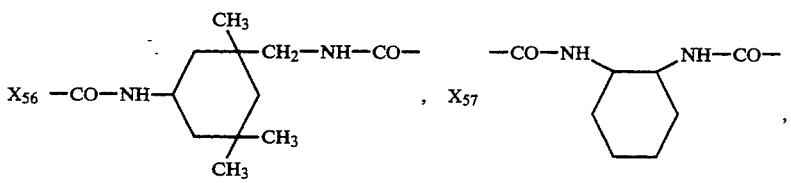

$X_{58}$ —CH$_2$—CO—, $X_{59}$ —CH=CH—CO—CH=CH—,

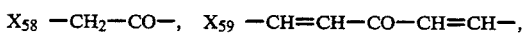

$X_{62}$ —CO—NH—R$_{43}$—CO—NH—I, 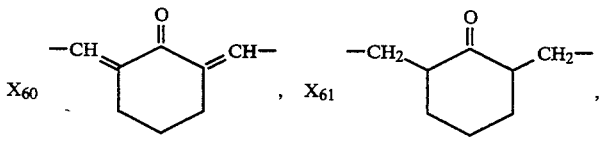

$X_{100}$ —CO—NH—R$_{43}$—CO—NH—R$_{43}$—NH—CO—,
$X_{101}$ —CO—NH—R$_{43}$—NH—CO—CH$_2$—CH$_2$—CO—NH—R$_{43}$—NH—CO—,
$X_{102}$ —CO—NH—R$_{43}$—NH—CO—CH=CH—CO—NH—R$_{43}$—NH—CO—,

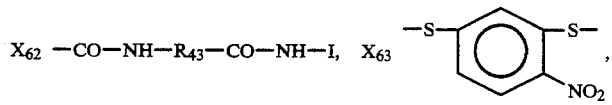

$X_{104}$ —SO$_2$—NR$_{44}$—(CH$_2$)$_g$—NR$_{44}$—SO$_2$—, $X_{105}$ —CO—NR$_{44}$—R$_{43}$—O—CO—,

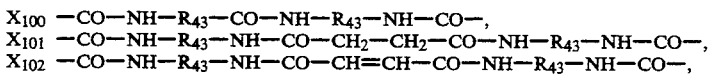

$X_{108}$ —CONH—R$_{43}$—NH—CO—NH—R$_{43}$—NH—CO—,

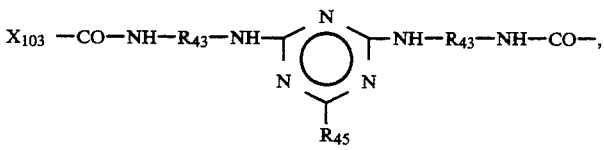

R$_{42}$ is halogen, C$_{1-4}$alkyl or C$_{1-4}$alkoxy, each R$_{43}$ independently is a linear or branched C$_{1-4}$alkylene group, —CH$_2$—CHOH—CH$_2$—, —CH$_2$CH$_2$—CHOH—CH$_2$— or —CH(CH$_3$)—CHOH—CH$_2$—, each R$_{44}$ independently is hydrogen or C$_{1-4}$alkyl group, each g independently is 1, 2, 3 or 4, each R$_{45}$ independently, is halogen, —NH—CH$_2$—CH$_2$—OH, —N(CH$_2$—CH$_2$—OH)$_2$, —NH$_2$, —OH, —NH—(CH$_2$)$_{2-3}$N(C$_2$H$_5$)$_2$,

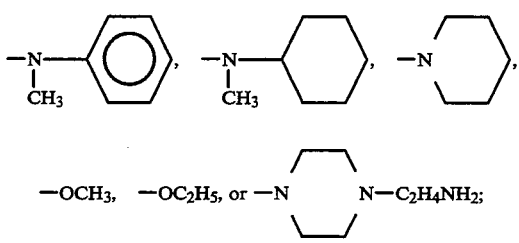

or $X_o$, when at least one $R_2$ is other than hydrogen, is selected from $X_1$, $X_2$, $X_{11}$, $X_{12}$, $X_{14}$, $X_{15}$, $X_{17}$ to $X_{21}$, $X_{25}$, $X_{27}$, $X_{32}$, $X_{34}$, $X_{57}$, $X_{62}$ and $X_{103}$; and $A^\ominus$ is an anion.

g is preferably 1, 2 or 3.

Each $R_{43}$ independently is preferably linear or branched $C_{1-4}$alkylene.

Furthermore, the invention provides a) a metal-free compound of formula I, in free base or acid addition salt form, in which B, $R_1$, $R_2$, T, $X_o$ and n are as defined above, with the provisos that 1) both T's are other than cyano, —COOR$_4$, —CON(R$_5$)$_2$ and —SO$_2$N(R$_5$)$_2$ in which each R$_5$ independently, is hydrogen or $C_{1-4}$alkyl, when $X_o$ is $X_1$, $X_2$, $X_3$, $X_5$, $X_6$, $X_9$, $X_{13}$ or $X_{21}$, and 2) both T's are other than —CN, —COOR$_4$ and —SO$_2$N(R$_5$)$_2$ in which each R$_5$, independently, is hydrogen or $C_{1-4}$alkyl, when $X_o$ is $X_{31}$ or $X_{32}$;

b) a metal-free compound of formula I, in free base or acid addition salt form, in which B, $R_1$, $R_2$, T, $X_o$ and n are as defined above, with the proviso that both T's are other than cyano, —COOR$_4$, —CON(R$_5$)$_2$ and —SO$_2$N(R$_5$)$_2$ in which each R$_5$ independently, is hydrogen or $C_{1-4}$alkyl;

c) a metal-free compound of formula I, in free base or acid addition salt form, in which B, $R_1$, $R_2$, T, $X_o$ and n are as defined above with the provisos that both T's are other than cyano, —COOR$_4$, —CON(R$_5$)$_2$ and —SO$_2$N(R$_5$)$_2$ in which each R$_5$ independently is hydrogen or $C_{1-4}$alkyl, and either i) $X_o$ is other than $X_1$; or
ii) $X_o$ is other than $X_2$; or
iii) $X_o$ is other than $X_3$; or
iv) $X_o$ is other than $X_5$; or
v) $X_o$ is other than $X_6$; or
vi) $X_o$ is other than $X_9$; or
vii) $X_o$ is other than $X_{13}$; or
viii) $X_o$ is other than $X_{21}$;

d) a metal-free compound of formula I, in free base or acid addition salt form, in which B, $R_1$, $R_2$, T, $X_o$ and n are as defined above, with the provisos that both T's are other than cyano, —COOR$_4$ and —SO$_2$N(R$_5$)$_2$ in which each R$_5$ independently is hydrogen or $C_{1-4}$alkyl, and either i) $X_o$ is other than $X_{31}$; or
ii) $X_o$ is other than $X_{32}$;

e) a metal-free compound of formula I, in free base or acid addition salt form, in which B, $R_1$, $R_2$, T, $X_o$ and n are as defined above with the proviso that $X_o$ is other than $X_1$, $X_2$, $X_3$, $X_5$, $X_6$, $X_9$, $X_{13}$, $X_{21}$, $X_{31}$ and $X_{32}$;

f) a 1:1 or 1:2 metal complex of a compound of formula I, in free base or acid addition salt form, in which B, $R_1$, $R_2$, T, $X_o$ and n are as defined above with the proviso that both T's are other than cyano, —COOR$_4$, —CON(R$_5$)$_2$ and —SO$_2$N(R$_5$)$_2$ in which each R$_5$ independently, is hydrogen or $C_{1-4}$alkyl;

g) a 1:1 or 1:2 metal complex of a compound of formula I, in free base or acid addition salt form, in which B, $R_1$, $R_2$, T, $X_O$ and n are as defined above with the provisos that both T's are other than cyano, —COOR$_4$, —CON(R$_5$)$_2$ and —SO$_2$N(R$_5$)$_2$ in which each R$_5$ independently, is hydrogen or $C_{1-4}$alkyl; and either i) $X_o$ is other than $X_1$; or
ii) $X_o$ other than $X_2$; or
iii) $X_o$ other than $X_3$; or
iv) $X_o$ is other than $X_5$; or
v) $X_o$ is other than $X_6$; or
vi) $X_o$ is other than $X_9$; or
vii) $X_o$ other than $X_{13}$; or
viii) $X_o$ other than $X_{21}$;

h) a 1:1 or 1:2 metal complex of a compound of formula I, in free base or acid addition salt form, in which B, $R_1$, $R_2$, T, $X_o$ and n are as defined above with the provisos that both T's are other than cyano, —COOR$_4$ and —SO$_2$N(R$_5$)$_2$ in which each R$_5$, independently, is hydrogen or $C_{1-4}$alkyl, and either i) $X_o$ is other than $X_{31}$; or
ii) $X_o$ is other than $X_{32}$;

i) a 1:1 or 1:2 metal complex of a compound of formula I, in free base or acid addition salt form, in which B, $R_1$, $R_2$, T, $X_o$ and n are as defined above with the provisos that $X_o$ is other than $X_1$, $X_2$, $X_3$, $X_5$, $X_6$, $X_9$, $X_{13}$, $X_{21}$, $X_{31}$ and $X_{32}$.

Any $R_{43}$ in a) to i) is independently preferably linear or branched $C_{1-4}$alkylene.

For the avoidance of doubt in $X_o$ where the bridging group is asymmetric, it can be attached to phenyl group D at either end. For the avoidance of doubt, a compound of formula I can be present in a mixture which may include one or more other compounds of formula I or not of formula I.

When the compounds of formula I are in 1:1 metal complex form, preferably the metal atom is copper, zinc, chromium, cobalt, nickel, iron or manganese and when the compounds of formula I are in 1:2 metal complex form, preferably the metal atom is chromium, nickel, cobalt or iron.

The alkylene group as $A_1$ may be linear or branched.

In the specification halogen means fluorine, chlorine, bromine, or iodine, preferably chlorine or bromine, particularly chlorine.

According to the invention, the molecule of a compound of formula I contains two identical pyridone coupling component residues. Depending on the significances of T and B, each pyridone residue of the molecule bears either one protonatable basic group optionally together with a quaternary ammonium group or one or two quaternary ammonium groups.

The term "protonatable basic group" includes protonatable primary, secondary and tertiary amino groups.

$R_1$ is preferably $R_1'$ where $R_1'$ is methyl, ethyl, phenyl, benzyl or cyclohexyl. More preferably $R_1$ is $R_1''$ where $R_1''$ is methyl or phenyl, especially methyl.

$R_2$ is preferably $R_2'$ where $R_2'$ is hydrogen methyl ethyl hydroxy methoxy ethoxy chlorine or bromine $R_2$ is more preferably $R_2''$ where $R_2''$ is hydrogen, hydroxy, methyl, methoxy, ethoxy or chlorine. Most preferably $R_2$ is $R_2'''$ where $R_2'''$ is hydrogen, hydroxy, methoxy or ethoxy. $R_2$ is also preferably $R_{2a}''$, where $R_{2a}''$ is hydrogen, hydroxy, methyl, methoxy or chlorine, especially hydrogen.

Among the significances of T, the significance of cyano is less preferred, particularly when $X_o$ is $X_9$, $X_{21}$, $X_{31}$, $X_{32}$, $X_{34}$, $X_{35}$, $X_{36}$, $X_{37}$ and $X_{55}$.

T is preferably T' where T' is hydrogen, —CN, —CON($R_5'$)$_2$, where $R_5'$ is as defined below, or

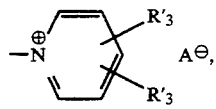

where $R_3'$ is as defined below. More preferably T is T" where T" is hydrogen, —CN, —CONH$_2$ or

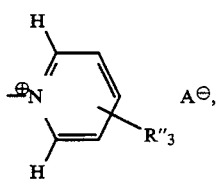

where $R_3"$ is as defined below.

Most preferably T is T'" where T'" is hydrogen,

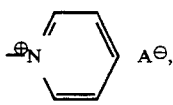

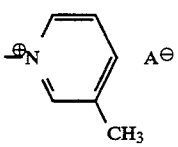

or

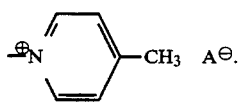

Preferably $R_3$ is $R_3'$ where $R_3'$ is hydrogen, methyl, ethyl, —NH$_2$ or —N(CH$_3$)$_2$. More preferably $R_3$ is $R_3"$ where $R_3"$ is hydrogen or methyl.

Preferably $R_5$ is $R_5'$ where $R_5'$ is hydrogen methyl or ethyl, or when two $R_5$ groups are attached to a nitrogen atom, both $R_5'$ groups together with the N-atom may form an unsubstituted pyrrolidinyl, piperidino, morpholino, piperazinyl or N-methylpiperazinyl radical. More preferably $R_5$ is hydrogen.

B is preferably B' where B' is —$A_1'$—$NR_7'R_8'$ or —$A_1'$—$^\oplus NR_7'R_8'R_9' A^\ominus$ where the symbols are as defined below. More preferably B is B" where B" is —(CH$_2$)$_2$—$NR_7"R_8"$, —(CH$_2$)$_3$—$NR_7"R_8"$, —(CH$_2$)$_2$—$NR_7"R_8"R_9"A^\ominus$ or —(CH$_2$)$_3$—$^\oplus NR_7"R_8"R_9" A^\ominus$ where the symbols are as defined below. Most preferably B is B'" where B'" is —(CH$_2$)$_2$—K or —(CH$_2$)$_3$—K, the symbol K being selected from

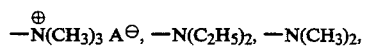

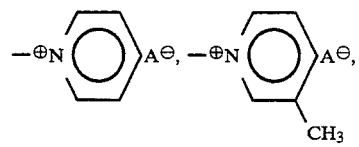

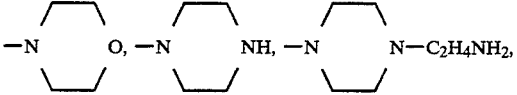

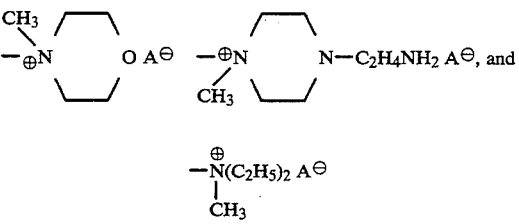

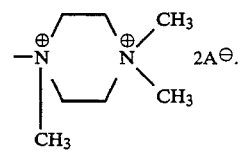

B is also preferably $B_a'"$ where $B_a'"$ is —(CH$_2$)$_2$—$K_a$ or —(CH$_2$)$_3$—$K_a$, the symbol Ka having one of the significances given above for K or being

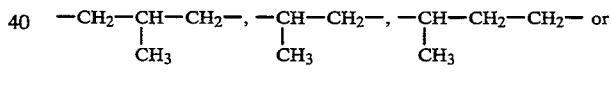

$A_1$ is preferably $A_1'$ where $A_1'$ is —(CH$_2$)$_2$—, —(CH$_2$)$_3$—, —(CH$_2$)$_4$—,

Preferably $R_7$ is $R_7'$ where $R_7'$ is linear or branched $C_{1-6}$alkyl unbranched hydroxy$C_{2-3}$alkyl, benzyl, 2-chloroethyl or 2-cyanoethyl.

More preferably $R_7$ is $R_7"$ where $R_7"$ is methyl or ethyl.

Preferably $R_8$ is $R_8'$ where $R_8'$ has one of the significances of $R_7'$, independently, and $R_9$ is $R_9'$ where $R_9'$ is methyl, ethyl, propyl or benzyl.

More preferably $R_8$ is $R_8"$ where $R_8"$ has one of the significances of $R_7"$ and $R_9$ is $R_9"$ where $R_9"$ is methyl ethyl or benzyl $R_7'$ and $R_8'$ together with the N-atom to which they are attached may also form a pyrrolidinyl, piperidino, morpholino, piperazinyl, N-methylpiperazinyl or N-aminoethylpiperazinyl group.

$R_7'$, $R_8'$ and $R_9'$ together with the N-atom to which they are attached may also form a pyridinium ring unsubstituted or substituted by one or two methyl groups or a radical β

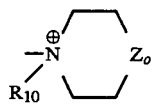

where $Z_o$ is a direct bond, —CH$_2$—, —O—, —S—, —SO$_2$—, —SO—, —NH—, >N-R$_{10}$, $\oplus$N—(R$_{10}$)$_2$ A$^\ominus$ or >N-C$_2$H$_4$—NH$_2$, and each R$_{10}$, independently, is methyl or ethyl.

R$_7''$ and R$_8''$ together with the N-atom to which they are attached may also form a morpholino, piperidino, piperazinyl, N-methylpiperazinyl or N-aminoethylpiperazinyl group.

R$_7''$, R$_8''$ and R$_9''$ together with the N-atom to which they are attached may also form a pyridinium, 2- or 3-picolinium, N-methylmorpholinium, N-methylpiperidinium, N-methylpiperazinium, N,N'-dimethylpiperazinium, N-methyl-N'-(2-aminoethyl)piperazinium or N,N',N'-trimethylpiperazinium A$^\ominus$ group may also form a N,N',N'-trimethylpiperazinium group.

$X_o$ is preferably $X_o'$ where $X_o'$ when all four R$_2$'s are hydrogen, is selected from X$_1$, X$_5$, X$_6$, X$_7$, X$_{10}$, X$_{11}$, X$_{12}$, X$_{16}$, X$_{17}$, X$_{22}$, X$_{25}$, X$_{26}$, X$_{27}$, X$_{30}$, X$_{31}$, X$_{49}$, X$_{50}$, X$_{51}$, X$_{53}$, X$_{54}$, X$_{58}$, X$_{59}$, X$_{62}$, X$_{101}$ (where R$_{43}$ is —(CH$_2$)$_{1-2}$), X$_{103}$ (where R$_{43}$ is —(CH$_2$)$_{1-2}$ and R$_{45}$ is —NH(CH$_2$)$_{2-3}$—N(C$_2$H$_5$)$_2$), X$_{104}$ (where R$_{44}$=H and g=2 or 3), X$_{108}$ (where R$_{43}$=—(CH$_2$)$_{1-3}$—), X$_{70-90}$ and X$_{110}$, where X$_{70-90}$ and X$_{110}$ are as defined below:

X$_{70}$ —NH—CO—NH—,

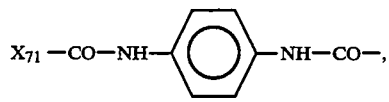

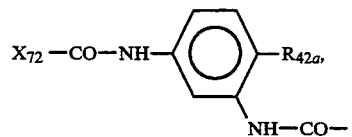

X$_{73}$ —NH—CO—CH$_2$—CO—NH—,

X$_{74}$ —NH—CO—CH=CH—CO—NH—.

X$_{75}$ —NH—CO—(CH$_2$)$_4$—CO—NH—,

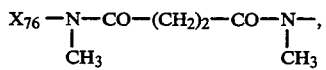

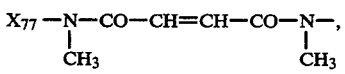

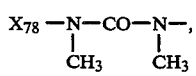

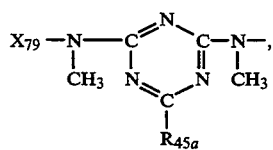

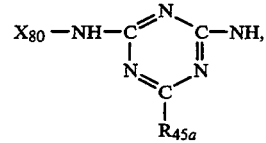

X$_{81}$ —CH$_2$—, X$_{82}$ —(CH$_2$)$_2$—, X$_{83}$ —(CH$_2$)$_3$—,

X$_{84}$ —(CH$_2$)$_4$—, X$_{85}$ —CO—NH—(CH$_2$)$_2$—NH—CO—,

X$_{86}$ —CO—NH—(CH$_2$)$_3$—NH—CO—,

X$_{87}$ —CO—NH—(CH$_2$)$_4$—NH—CO—,

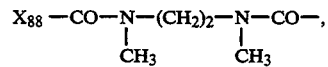

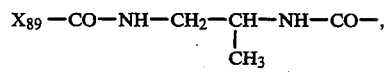

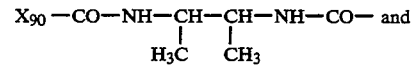

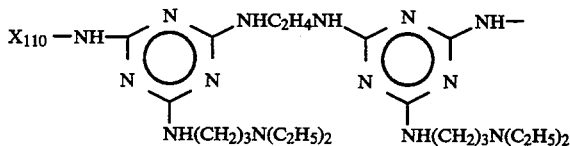

or $X_o'$, when at least one R$_2$ is other than hydrogen, is X$_1$, X$_{11}$, X$_{12}$, X$_{17}$, X$_{62}$, X$_{70}$, X$_{71}$, X$_{74}$, X$_{79}$, X$_{80}$, X$_{81}$, X$_{82}$, X$_{85}$, X$_{86}$, X$_{88}$ or X$_{103}$ where R$_{43}$ is —(CH$_2$)$_{1-2}$— as defined above, or $X_o'$, when at least one R$_2$ is other than hydrogen, is also $X_{oa}'$ where $X_{oa}'$ is X$_1$, X$_{11}$, X$_{12}$, X$_{17}$, X$_{27}$, X$_{31}$, X$_{62}$, X$_{70}$, X$_{71}$, X$_{74}$, X$_{79}$, X$_{80}$, X$_{81}$, X$_{82}$, X$_{83}$, X$_{85}$, X$_{86}$, X$_{88}$, X$_{89}$ or X$_{103}$ (where R$_{43}$ is —(CH$_2$)$_{1-2}$—) as defined above, where R$_{42a}$ is hydrogen, Cl, CH$_3$ or OCH$_3$, and R$_{45a}$ is Cl, —NH(CH$_2$)$_2$OH, methoxy, hydroxy, —NH$_2$, ethoxy, —NH(CH$_2$)$_3$N(C$_2$H$_5$)$_2$, —N(CH$_2$CH$_2$OH)$_2$,

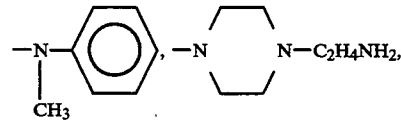

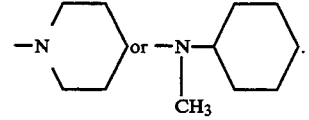

When $X_o'$ is X$_{31}$, X$_{79}$, X$_{80}$, X$_{86}$ or X$_{89}$, both T's are preferably hydrogen, —CON(R$_5'$)$_2$ or

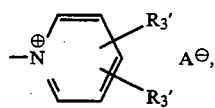

more preferably hydrogen, —CONH$_2$ or 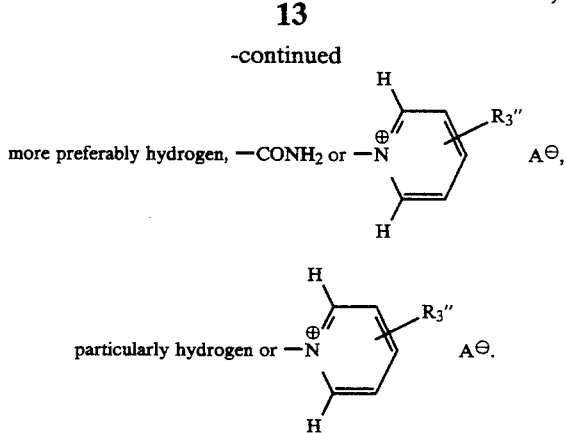

particularly hydrogen or

More preferably X$_o$ is X$_o$" when all four R$_2$'s are hydrogen, X$_a$" being X$_1$, X$_{11}$, X$_{17}$, X$_{27}$, X$_{51}$, X$_{53}$, X$_{54}$, X$_{62}$, X$_{70}$ to X$_{77}$, X$_{79}$, X$_{80}$, X$_{81}$, X$_{82}$, X$_{85}$ to X$_{90}$ or X$_{110}$, especially X$_{11}$, X$_{17}$, X$_{81}$, X$_{82}$, X$_{85}$, X$_{86}$ or X$_{89}$.

When at least one R$_2$ is other than hydrogen, then X$_o$ is preferably X$_o$" where X$_o$" is X$_{11}$, X$_{17}$, X$_{27}$, X$_{62}$, X$_{81}$, X$_{82}$, X$_{83}$, X$_{85}$, X$_{86}$ or X$_{89}$.

In the compounds of formula I, preferably each ring D or D$_1$, independently, in addition to X$_o$ and the azo group, bears either one further substituent, preferably a methoxy, ethoxy or hydroxy group, especially in a position ortho to the azo group, or no further substituent. More preferably, when further substituted, at least one of rings D and D$_1$ is further substituted by hydroxy or both rings D and D$_1$ are each further substituted by methoxy.

X$_o$ is preferably attached in the 2-, 3- and/or 4-positions, particularly the 3 and/or 4-positions on the rings D and D$_1$.

Each ring D or D$_1$ may also bear two substituents R$_2$, in which case one R$_2$ is preferably a metallisable group and the other is halogen or C$_{1-4}$alkyl.

Preferred compounds of the invention are the 1:1 and 1:2 metal complexes of compounds in free base or acid addition salt form, of formula II X$_o$' being attached in the 3- or 4-position (shown) on rings D' and D$_1$'.

The following groups of compounds are further preferred:

a) metal-free compounds of formula II and formula III, in free base or acid addition salt form, in which the B', B", R$_1$', R$_1$", R$_2$', R$_{2a}$", T', T", X$_o$ and X$_o$' are as defined above, with the provisos that both T"s are other than cyano or —CCN(R$_5$')$_2$ in which each R$_5$' independently is hydrogen, methyl or ethyl when X$_o$ is X$_1$, X$_2$, X$_3$, X$_5$, X$_6$, X$_9$, X$_{13}$ or X$_{21}$, and both T"s are other than cyano when X$_o$ is X$_{31}$ or X$_{32}$;

or, in the case of formula III, both T"'s are other than cyano or —CONH$_2$ when X$_o$' is X$_1$, X$_5$, X$_6$, X$_{70}$, X$_{78}$ or X$_{81}$ to X$_{84}$ and both T"'s are other than cyano when X$_o$' is X$_{31}$, X$_{79}$ and X$_{80}$;

b) metal-free compounds of formula II and formula III, in free base or acid addition salt form, in which B', B", R$_1$', R$_1$", R$_2$', R$_{2a}$", T', T", X$_o$ and X$_o$' are as defined above, with the proviso that both T"s are other than cyano or —CON(R$_5$')$_2$ in which each R$_5$' independently is hydrogen, methyl or ethyl, or, in the case of formula III, both T"'s are other than cyano or —CONH$_2$;

c) metal-free compounds of formula II and formula III, in free base or acid addition salt form, in which B', B", R$_1$', R$_1$", R$_2$', R$_{2a}$", T', T", X$_o$ and X$_o$' are as defined above, with the provisos that in the case of formula II, both T"s are other than cyano or —CON(R$_5$')$_2$ in which each R$_5$' independently is hydrogen, methyl or ethyl and either i) X$_o$ is other than X$_1$; or
ii) X$_o$ is other than X$_2$; or
iii) X$_o$ is other than X$_3$; or
iv) X$_o$ is other than X$_5$; or
v) X$_o$ is other than X$_6$; or
vi) X$_o$ is other than X$_9$; or

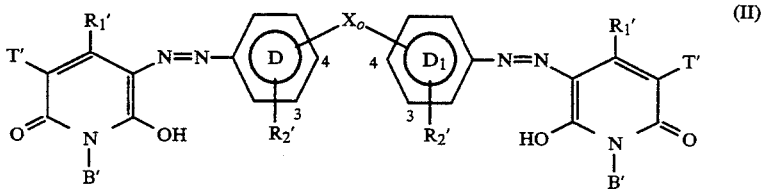

(II)

where the symbols R$_1$', T', B', R$_2$' and X$_o$ are as defined above

More preferred compounds of the invention are 1:1 or 1:2 metal complex of a compound, in free base or acid addition salt form, of formula III vii) X$_o$ is other than X$_{13}$; or
viii) X$_o$ is other than X$_{21}$; or
or, in the case of formula III, both T"'s are other than cyano or —CONH$_2$ and either
i) X$_o$' is other than X$_1$; or

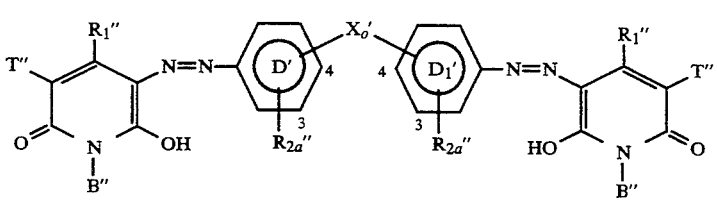

(III)

in which the R$_1$", R$_{2a}$", T", B" and X$_o$' are as defined above, ii) X$_o$' is other than X$_5$; or
iii) X$_o$' is other than X$_6$; or iv) $X_o'$ is other than $X_{70}$; or
v) $X_o'$ is other than $X_{78}$; or
vi) $X_o'$ is other than $X_{81}$ to $X_{84}$;

d) metal-free compounds of formula II and formula III, in free base or acid addition salt form, in which B', B'', $R_1'$, $R_1''$, $R_2'$, $R_{2a}''$, T', T'', $X_o$ and $X_o'$ are as defined above, with the provisos that in the case of formula II, both T''s are other than cyano and either
  i) $X_o$ is other than $X_{31}$; or
  ii) $X_o$ is other than $X_{32}$;
or, in the case of formula III, both T'''s are other than cyano and either
  i) $X_o'$ is other than $X_{31}$; or
  ii) $X_o'$ is other than $X_{79}$ or $X_{80}$;

e) metal-free compounds of formula II and formula III, in free base or acid addition salt form, in which B', B'', $R_1'$, $R_1''$, $R_2'$, $R_{2a}''$, T', T'', $X_o$ and $X_o'$ are as defined above, with the proviso that
$X_o$ is other than $X_1$, $X_2$, $X_3$, $X_5$, $X_6$, $X_9$, $X_{13}$, $X_{21}$, $X_{31}$ or $X_{32}$,
or, respectively, $X_o'$ is other than $X_1$, $X_5$, $X_6$, $X_{31}$, $X_{70}$ and $X_{78}$ to $X_{84}$;

f) 1:1 and 1:2 metal complexes of compounds of formula II or formula III, in free base or acid addition salt form, in which B', B'', $R_1'$, $R_1''$, $R_2'$, $R_{2a}''$, T', T'', $X_o$ and $X_o'$ are as defined above, with the proviso that
both T''s are other than cyano or —CON($R_5'$)$_2$ in which each $R_5'$ independently is hydrogen, methyl or ethyl,
or, respectively, both T'''s are other than cyano or —CONH$_2$;

g) 1:1 and 1:2 metal complexes of compounds of formula II or formula III, in free base or acid addition salt form, in which B', B'', $R_1'$, $R_1''$, $R_2'$, $R_{2a}''$, T', T'', $X_o$ and $X_o'$ are as defined above, with the provisos that in the case of formula II, both T''s are other than cyano or —CON($R_5'$)$_2$ in which each $R_5'$ independently is hydrogen, methyl or ethyl and either
  i) $X_o$ is other than $X_1$; or
  ii) $X_o$ is other than $X_2$; or
  iii) $X_o$ is other than $X_3$; or
  iv) $X_o$ is other than $X_5$; or
  v) $X_o$ is other than $X_6$; or
  vi) $X_o$ is other than $X_9$; or
  vii) $X_o$ is other than $X_{13}$; or
  viii) $X_o$ is other than $X_{21}$; or or, in the case of formula III, both T'''s are other than cyano or —CONH$_2$ and either
  i) $X_o'$ is other than $X_1$; or
  ii) $X_o'$ is other than $X_5$; or
  iii) $X_o'$ is other than $X_6$; or
  iv) $X_o'$ is other than $X_{70}$; or
  v) $X_o'$ is other than $X_{78}$; or
  vi) $X_o'$ is other than $X_{81}$ to $X_{84}$;

h) 1:1 and 1:2 metal complexes of the compounds formula II or formula III, in free base or acid addition salt form, in which B', B'', $R_1'$, $R_1''$, $R_2'$, $R_{2a}''$, T', T'', $X_o$ and $X_o'$ are as defined above, with the provisos that in the case of formula II, both T''s are other than cyano and either
  i) $X_o$ is other than $X_{31}$; or
  ii) $X_o$ is other than $X_{32}$;
or, in the case of formula III, both T'''s are other than cyano and either
  i) $X_o'$ is other than $X_{31}$; or
  ii) $X_o'$ is other than $X_{79}$ or $X_{80}$; and i) 1:1 and 1:2 metal complexes of the compounds formula II or formula III, in free base or acid addition salt form, in which the symbols B', B'', $R_1'$, $R_1''$, $R_2'$, $R_{2a}''$, T', T'', $X_o$ and $X_o'$ are as defined above, with the proviso that
$X_o$ is other than $X_1$, $X_2$, $X_3$, $X_5$, $X_6$, $X_9$, $X_{13}$, $X_{21}$, $X_{31}$ or $X_{32}$,
or, respectively, $X_o'$ is other than $X_1$, $X_5$, $X_6$, $X_{31}$, $X_{70}$ and $X_{78}$ to $X_{84}$.

In the compounds of formulae II and III according to groups a) and d) and in the 1:1 and 1:2 metal complexes according to group h), both T''s, respectively both T'''s, are preferably hydrogen or

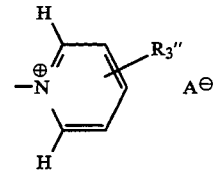

more preferably when $X_o$ is $X_2$, $X_{11}$, $X_{17}$, $X_{31}$, $X_{32}$ or $X_{34}$, respectively, when $X_o'$ is $X_{31}$, $X_{79}$, $X_{80}$ to $X_{86}$, $X_{88}$ or $X_{89}$.

Further preferred compounds of formula I are those, in free base or acid addition salt form, of formula IV

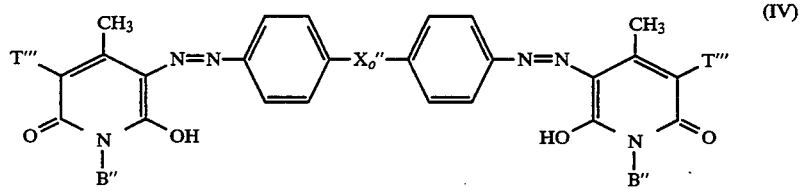

in which T'''', B''' and $X_o''$ are as defined above. Compounds of formula IV in which both B''''s have one of the significances of $B_a'''$ are also preferred.

Other preferred compounds of formula I are those, in free base or acid addition salt form, of formula IVa

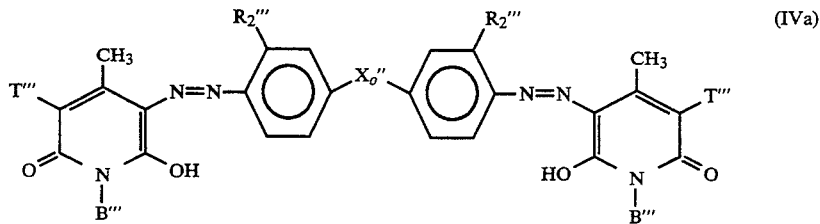
(IVa)

in which T''', B''', R$_2$''' and X$_o$'' are as defined above. Particularly preferred compounds of formula IVa are those wherein both B''''s are —(CH$_2$)$_{2\text{-}3}$—K, K being —N(CH$_3$)$_2$ or —N(C$_2$H$_5$)$_2$, and X$_o$'' is X$_{11}$, X$_{17}$, X$_{81}$, X$_{82}$, X$_{83}$, X$_{85}$, X$_{86}$ or X$_{89}$.

Interesting compounds of formula I in 1:1 metal complex form and in free base or acid addition salt form are of formula V

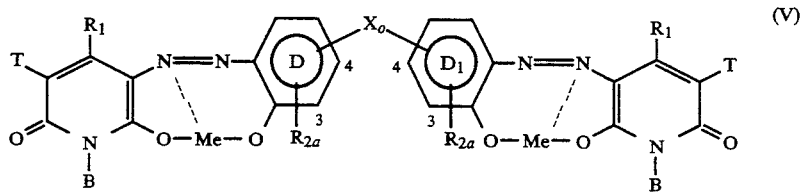
(V)

in which each R$_{2a}$, independently, is hydrogen, halogen or C$_{1\text{-}4}$alkyl;

Me is copper, chromium, manganese, cobalt or nickel, and B, T, R$_1$ and X$_o$ are as defined above.

Preferably Me is copper.

Preferred compounds of formula I in 1:1 metal complex form and in free base or acid addition salt form are of formula VI Most preferred compounds of formula I in 1:1 metal complex form are those of formula VI in which R$_1$ is R$_1$', particularly R$_1$'', especially methyl; T is T', particularly T''; especially T''', R$_2$ and R$_{2a}$ are hydrogen; B is B', preferably B'', particularly B'''; and X$_o$ and X$_o$', particularly X$_o$''.

Preferred compounds of formula I in 1:2 metal complex form and in free base or acid addition salt form are of formula VII

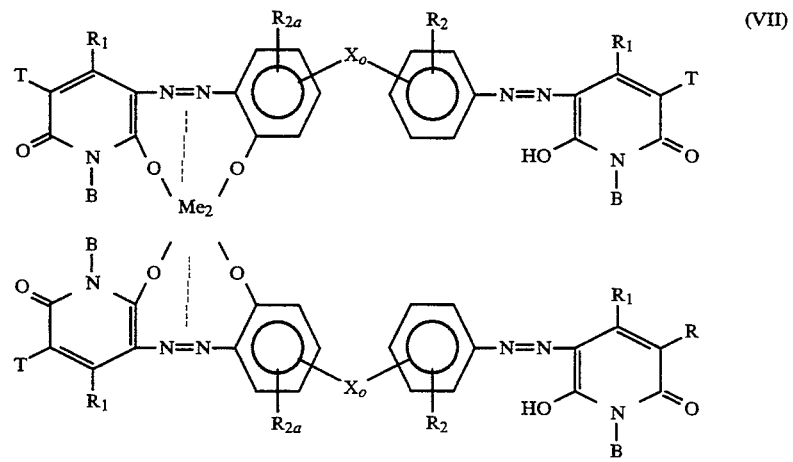
(VII)

in which R$_1$, R$_2$, R$_{2a}$, T, B and X$_o$ are as defined above, and

Me$_2$ is chromium, cobalt or iron.

Most preferred compounds of formula I in 1:2 metal complex form are those of formula VII in which R$_1$ is R$_1$+, particularly R$_1$'', especially methyl; T is T', particularly T'', especially T'''; R$_2$ and R$_{2a}$ are hydrogen; B

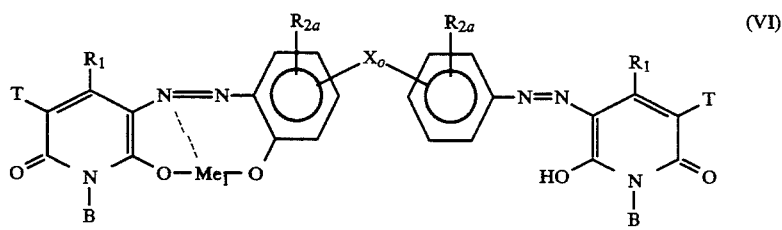
(VI)

In which R$_1$, R$_2$, R$_{2a}$, T, B and X$_o$ are as defined above, and Me$_1$ is copper.

is B', preferably B'', particularly B''', and X$_o$ is X$_o$', particularly X$_o$''.

Any $R_{43}$ in formulae II–VII, the preferences thereof and groups a) -i) following formulae II and VII is independently preferably linear or branched $C_{1-4}$alkylene.

Further, according to the invention there is provided a process for preparing compounds of formula I as defined above comprising coupling to 1 mole of a tetrazotised compound of a diamine of formula VIII

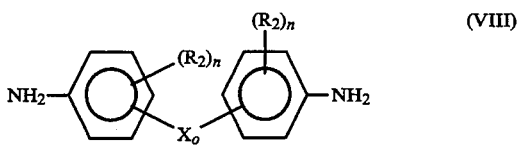

in which $R_2$, n and $X_o$ are as defined above, 2 moles of a compound of formula IX

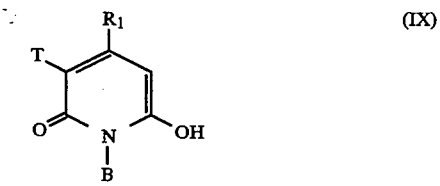

in which $R_1$, B and T are as defined above, and, if required, the resulting compounds of formula I may be converted into the corresponding 1:1 or 1:2 metal complex form, and/or into the corresponding acid addition salt form.

Compounds of formulae VIII and IX are known or may be made by known methods from known compounds.

Coupling to form compounds of formula I can be carried out according to known methods. Advantageously, coupling is carried out in aqueous (acid, neutral or alkali) medium at a temperature from −10° C. to room temperature, if necessary, in the presence of a coupling accelerator such as pyridine or urea. Alternatively, coupling may be effected in a mixture of solvents, for example, water and an organic solvent.

Metallisation of the compounds of formula I can be achieved by known methods.

The disazo compounds of formula I in 1:1 metal complex form may be prepared by metallising compounds of formula I in metal-free form with a metal selected from copper, cobalt, iron, nickel, manganese, chromium and zinc.

The disazo compounds of formula I in 1:2 metal complex form may be prepared by metallising compounds of formula I in metal-free form with a metal selected from chromium, nickel, cobalt and iron.

A further method for the preparation of disazo compounds of formula I in 1:2 metal complex form is by reacting a compound of formula I or other than formula I in metal-free form with a disazo compound 1:1 metal complex of formula I when the metal is chromium, nickel, cobalt or iron.

The metallisation process to form a 1:1 metal complex of the type of formula VI is advantageously carried out by treating 1 mole of a disazo compound with a metallising agent containing 1 equivalent of metal.

1:1 Metal complex formation using copper can be carried out by directly reacting a compound of formula I with metal salt or by oxidative coppering preferably at 40°–70° C. and at a pH of 4–7 in the presence of a Cu(II) salt or with copper filings in the presence of $H_2O_2$ or any other oxidizing material; or demethylating coppering can be carried out in a pH range of 3–4 at a high temperature.

Metallisation is carried out advantageously in aqueous medium or in a mixture of water and a water-miscible organic solvent, for example acetone, lower alkyl alcohols, dimethylformamide, formamide, glycols or acetic acid at a pH range from 1.0 to 8.0, preferably pH 2 to 7. The metallisation process may be carried out at a temperature from room temperature to the boiling point of the reaction medium.

Alternatively, metallisation may be effected in a wholly organic medium (for example dimethylformamide). Advantageously, for instance, cobaltisation may be carried out in the presence of an inorganic nitrite such as lithium, sodium, ammonium or potassium nitrite in the ratio of 2 to 6 moles of nitrite per gram atom of cobalt.

Suitable cobalt-yielding compounds are, for example, cobalt(II) and Co(III) sulphate, acetate, formate and chloride.

Copper-yielding compounds are, for example, cupric sulphate, cupric formate, cupric acetate and cupric chloride.

The nickel-yielding compounds are Ni(II) or Ni(III) compounds, such as nickel formate, nickel acetate and nickel sulphate.

Preferred manganese-yielding compounds are Mn(II) compounds and iron-yielding compounds are Fe(II) or Fe(III) compounds. Examples of these and zinc-yielding compounds are manganese, iron and zinc formate, acetate and sulphate.

Preferred chromium-yielding compounds are Cr(II) and Cr(III) formate, acetate and sulphate.

In the compounds of formula I the anions $A^{\ominus}$ can be any nonchromophoric anions such as those conventional in basic dyestuff chemistry. Suitable anions include chloride, bromide, sulphate, bisulphate, methylsulphate, aminosulphonate, perchlorate, benzene-sulphonate, oxalate, maleate, acetate, propionate, lactate, succinate, tartrate, malate, methane-sulphonate and benzoate as well as complex anions, for example zinc chloride double salts and anions of boric acid, citric acid, glycollic acid, diglycollic acid and adipic acid or addition products of ortho boric acids with polyalcohols with at least one cis diol group present. These anions can be exchanged for each other by ion exchange resins on reaction with acids or salts (for example via the hydroxide or bicarbonate) or according to German Offenlegungsschrift 2,001,748 or 2,001,816.

The compounds of the invention are suitable for dyeing, padding or printing fibres, threads or textile materials, particularly natural or regenerated cellulose materials for example cotton, polyester or synthetic polyamides modified by anionic groups. Such polyesters and polyamides are described in Belgian Patent 706,104 and U.S. Pat. No. 3,379,723.

The compounds of the invention are also used for dyeing, padding or printing fibres, threads or textiles produced therefrom which consist of or contain homo- or mixed polymers of acrylonitrile or of 1,1-dicyanoethylene.

The textile material is dyed, printed or pad-dyed in accordance with known methods. Acid modified-polyamide is dyed particularly advantageously in an aqueous, neutral or acid medium, at temperatures of 60° C. to boiling point or at temperatures above 100° C. under pressure.

The textile material may also be dyed by the compounds of formula I in organic solvents, e.g. in accordance with the directions given in German Offenlegungsschrift 2,437,549.

Cellulose material is mainly dyed by the exhaust process, i.e. from a long or short bath, at room temperature to boiling temperature, optionally under pressure, whereby the ratio of the bath is from 1:1 to 1:100 and preferably from 1:20 to 1:50. If dyeing is effected from a short bath, then the liquor ratio is 1:3 to 1:15. The pH of the dyebath varies between 3 and 10 (for short and long dyebaths).

Printing may be effected in accordance with known methods.

The dyestuffs of the invention are particularly suitable for dyeing or printing paper, e.g. for the production of bulk-dyed, sized and unsized paper. The dyestuffs may similarly be used for dyeing paper by the dipping process. The dyeing of paper is effected by known methods. The compounds of the invention are especially suitable for dyeing ligneous fibre materials, particularly bleached or unbleached mechanical wood pulp paper, thermomechanical pulp, unbleached cellulose, waste paper and china clay, calcium carbonate and talcum.

The azo compounds of the invention may also be applied to bast fibres such as hemp, flax, sisal, jute, coir or straw.

The dyestuffs of the invention are also suitable for dyeing or printing leather by known methods and dyeings with good fastness properties are obtained.

Dyeings prepared with dyestuffs of the invention on ligneous fibre materials produce a substantially clear waste liquor which is important for environmental reasons. The dyestuffs of the invention have good build-up properties, do not bleed once applied to ligneous fibre substances and are not pH sensitive. They have a high affinity for ligneous fibre materials, particularly bleached or unbleached mechanical wood pulp paper and unbleached cellulose and do not mottle on mechanical wood pulp paper. Dyeings produced with dyestuffs of the invention have good light fastness and the nuance on exposure for a long time to light fades tone in tone. The dyestuffs of the invention have good wet-fastness properties not only for water but also for milk, soap, water, sodium chloride solution, urine, fruit juice and sweetened mineral water. Further dyeings made with dyestuffs of the invention are fast to alcoholic beverages due to good alcohol fastness. Further, the dyestuffs of the invention have good light stability.

The compounds of the invention are advantageously used in their acid addition salt form, e.g. a salt produced by addition of a carboxylic acid such as acetic acid, lactic acid, formic acid, methoxyacetic acid, ethoxyacetic acid or glycollic acid, or quaternary ammonium salt form.

For their use the azo compounds of the invention are suitably worked up into stable solid or liquid preparations, according to known methods, advantageously by grinding or granulating or by dissolving in suitable solvents, optionally adding an assistant, e.g. a stabiliser, a solubilising or a diluting agent such as urea. Such preparations may be obtained, for example, as described in French Patent Specifications 1,572,030 and 1,581,900 or in accordance with German DOS 2,001,748 and 2,001,816.

Liquid dyeing compositions are preferably as follows:

1 part by weight of a compound of formula I (in acid addition salt form or quaternary ammonium salt form);

0.01–1 part by weight of an inorganic salt (preferably 0.1 part);

0.01–1 part by weight of an organic acid such as formic, acetic, lactic, citric, propionic or methoxyacetic acid;

1–8 parts by weight of water; and

0–5 parts by weight of a solubilising agent such as a glycol (diethylene glycol, triethylene glycol or hexylene glycol ), a glycol ether such as methyl cellosolve methylcarbitol, butylpolyglycol, urea, formamide and dimethylformamide.

Solid dyeing preparations are preferably as follows:

1 part by weight of a compound of formula I (in acid addition salt form or quaternary ammonium salt form)

0.01–1 part by weight of an inorganic salt (preferably 0.01 to 0. 1 part) and

0–8 parts by weight of a diluting agent such as urea, dextrin, glucose or d-glucose).

The solid compositions may usually contain up to 10% water.

The entire specification of great-grandparent application Ser. No. 06/845,097 (including the claims), particularly pages 1 to 16, is hereby incorporated by reference as if set forth herein in its entirety.

The invention will now be illustrated by the following Examples in which all parts are by weight and all temperatures are in degrees Celsius.

EXAMPLE 1

19.8 Parts (0.1M) of 4,4'-diaminodiphenylmethane are tetrazotised according to known methods with 13.8 parts (0.2M) of sodium nitrite at 0°–5° in 200 parts of water and 60 parts of 30% hydrochloric acid. 64.4 Parts (0.2M) of a compound of the formula

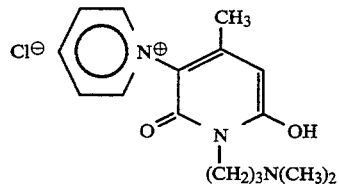

dissolved in 250 parts of water are added over 30 minutes to the ice cold tetrazotised solution. By the addition of a 30% NaOH solution the pH is brought to 4.5. The resulting dyestuff is of formula 1b

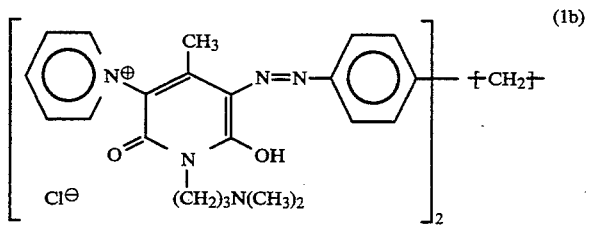

(1b)

and is in solution.

By concentration under vacuum or by precipitation in acetone/alcohol the dyestuff is isolated.

The reaction mixture however can be used directly for dyeing without isolating the product.

The dyestuff of formula 1b has a high solubility in water and gives yellow dyeings with good fastness properties.

EXAMPLES 2 TO 86

Compounds of the formula

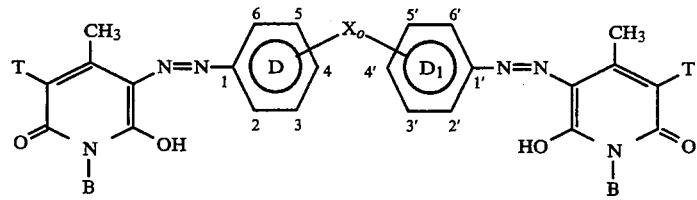

in which the symbols are defined in Table I below, wherein the asterisked atom is attached to phenyl ring D, can be produced by a method analogous to that of Example 1 from appropriate reactants.

In Table I, T has the following significances:
$T_1$ is H
$T_2$ is —$CONH_2$
$T_3$ is —CN

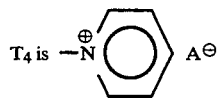

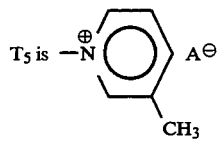

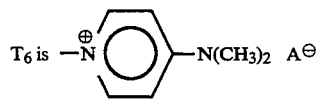

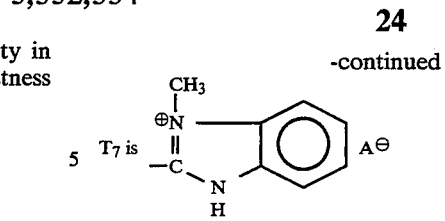

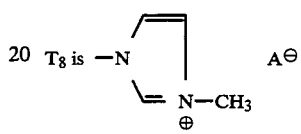

B has the following significances:
$B_1$ is —$(CH_2)_2N(CH_3)_2$
$B_2$ is —$(CH_2)_3N(CH_3)_2$ $B_3$ is —$(CH_2)_2\overset{\oplus}{N}(CH_3)_3$ $A^\ominus$ $B_4$ is —$(CH_2)_3\overset{\oplus}{N}(CH_3)_3$ $A^\ominus$ $B_5$ is —$(CH_2)_3N(C_2H_5)_2$

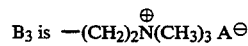

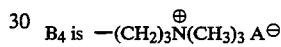

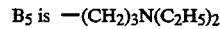

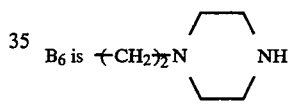

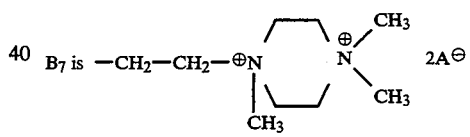

| Ex. | T | B | $X_o$ | position of $X_o$ on ring D and ring $D_1$ | Shade of the dyeing |
|---|---|---|---|---|---|
| 2 | $T_4$ | $B_1$ | -(CH₂)- | (4,4') | yellow |
| 3 | $T_4$ | $B_4$ | -(CH₂)- | (4,4') | yellow |
| 4 | $T_5$ | $B_1$ | -(CH₂)- | (4,4') | yellow |
| 5 | $T_5$ | $B_2$ | -(CH₂)- | (4,4') | yellow |
| 6 | $T_5$ | $B_3$ | -(CH₂)- | (4,4') | yellow |
| 7 | $T_5$ | $B_4$ | -(CH₂)- | (4,4') | yellow |
| 8 | $T_6$ | $B_4$ | -(CH₂)- | (4,4') | yellow |
| 9 | $T_7$ | $B_4$ | -(CH₂)- | (4,4') | yellow |
| 10 | $T_8$ | $B_4$ | -(CH₂)- | (4,4') | yellow |

-continued

| Ex. | T | B | $X_o$ | position of $X_o$ on ring D and ring $D_1$ | Shade of the dyeing |
|---|---|---|---|---|---|
| 11 | $T_4$ | $B_2$ |  | (4,4') | yellow |
| 12 | $T_4$ | $B_2$ | —S— | (4,4') | yellow |
| 13 | $T_4$ | $B_2$ | —NH— | (4,4') | blue |
| 14 | $T_4$ | $B_2$ | —O— | (4,4') | orange |
| 15 | $T_4$ | $B_2$ | —SO$_2$— | (4,4') | yellow |
| 16 | $T_4$ | $B_2$ | —NHCONH— | (4,4') | red |
| 17 | $T_4$ | $B_1$ | —NHCONH— | (3,3') | yellow |
| 18 | $T_4$ | $B_2$ | —CONH— | (4,4') | orange |
| 19 | $T_5$ | $B_2$ | *—CONH— | (4,4') | orange |
| 20 | $T_4$ | $B_4$ | *—CONH— | (4,4') | orange |
| 21 | $T_5$ | $B_4$ | *—CONH— | (4,4') | orange |
| 22 | $T_4$ | $B_2$ | *—CONH— | (4,3') | yellow |
| 23 | $T_5$ | $B_4$ | *—CONH— | (4,3') | yellow |
| 24 | $T_4$ | $B_4$ | *—CONH— | (4,3') | yellow |
| 25 | $T_5$ | $B_2$ | *—CONH— | (3,3') | yellow |
| 26 | $T_4$ | $B_1$ | 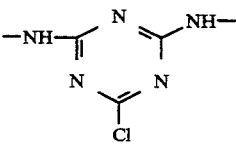 | (4,4') | red |
| 27 | $T_5$ | $B_4$ | 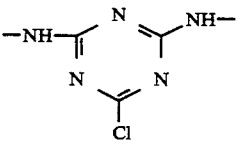 | (4,4') | red |
| 28 | $T_4$ | $B_2$ | 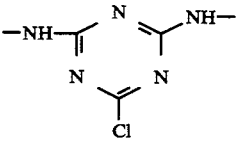 | (4,4') | red |
| 29 | $T_4$ | $B_1$ | 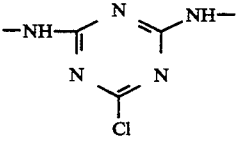 | (3,3') | yellow |
| 30 | $T_5$ | $B_2$ | 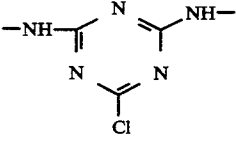 | (4,4') | red |

-continued

| Ex. | T | B | $X_o$ | position of $X_o$ on ring D and ring $D_1$ | Shade of the dyeing |
|---|---|---|---|---|---|
| 31 | $T_1$ | $B_2$ | —CO—NH—CH$_2$—CH(CH$_3$)—NH—CO— | (4,4') | yellow |
| 32 | $T_1$ | $B_5$ | —CO—NH—CH$_2$—CH(CH$_3$)—NH—CO— | (4,4') | yellow |
| 33 | $T_4$ | $B_2$ | —CH$_2$CH$_2$— | (4,4') | yellow |
| 34 | $T_4$ | $B_2$ | —CONHCH$_2$CH$_2$NHCO— | (4,4') | yellow |
| 35 | $T_4$ | $B_2$ | —CONHCH$_2$CHOHCH$_2$NHCO— | (4,4') | yellow |
| 36 | $T_4$ | $B_2$ | *—SO$_2$NH— | (4,3') | yellow |
| 37 | $T_4$ | $B_2$ | —NHCONH— | (3,3') | yellow |
| 38 | $T_4$ | $B_4$ | —O—CH$_2$—O— | (4,4') | orange |
| 39 | $T_1$ | $B_2$ | —NH— | (4,4') | blue |
| 40 | $T_4$ | $B_2$ | —S—S— | (4,4') | orange |
| 41 | $T_1$ | $B_2$ | —CH$_2$— | (4,4') | yellow |
| 42 | $T_1$ | $B_6$ | —CONH—CH$_2$—CH(CH$_3$)—NHCO— | (4,4') | yellow |
| 43 | $T_1$ | $B_5$ | —CH$_2$— | (4,4') | yellow |
| 44 | $T_1$ | $B_7$ | —CONH—CH$_2$—CH(CH$_3$)—NHCO— | (4,4') | yellow |
| 45 | $T_1$ | $B_2$ | —CH$_2$CH$_2$— | (4,4') | yellow |
| 46 | $T_1$ | $B_6$ | —CH$_2$— | (4,4') | yellow |
| 47 | $T_1$ | $B_5$ | —CH$_2$CH$_2$— | (4,4') | yellow |
| 48 | $T_1$ | $B_7$ | —CH$_2$— | (4,4') | yellow |
| 49 | $T_1$ | $B_2$ | —CONH— | (4,4') | yellow |
| 50 | $T_3$ | $B_5$ | —CONH— | (4,4') | yellow |
| 51 | $T_1$ | $B_2$ | *—CONH— | (4,3') | yellow |
| 52 | $T_1$ | $B_2$ | —CONHCH$_2$CH$_2$NHCO— | (4,4') | yellow |
| 53 | $T_3$ | $B_2$ | —CONHCH$_2$CH$_2$NHCO— | (4,4') | yellow |
| 54 | $T_1$ | $B_5$ | —CONHCH$_2$CH$_2$NHCO— | (4,4') | yellow |
| 55 | $T_3$ | $B_5$ | —CONHCH$_2$CH$_2$NHCO— | (4,4') | yellow |
| 56 | $T_1$ | $B_2$ | —S— | (4,4') | yellow |
| 57 | $T_3$ | $B_2$ | —S— | (4,4') | yellow |
| 58 | $T_1$ | $B_5$ | —S— | (4,4') | yellow |
| 59 | $T_1$ | $B_6$ | —S— | (4,4') | yellow |
| 60 | $T_1$ | $B_7$ | —S— | (4,4') | yellow |
| 61 | $T_4$ | $B_5$ | —S—(C$_6$H$_3$(NO$_2$))—S— | (4,4') | yellow |
| 62 | $T_1$ | $B_5$ | *—CONH— | (4,3') | yellow |
| 63 | $T_3$ | $B_2$ | *—CONH— | (4,3') | yellow |
| 64 | $T_3$ | $B_5$ | *—CONH— | (4,3') | yellow |
| 65 | $T_1$ | $B_6$ | *—CONH— | (4,3') | yellow |
| 66 | $T_4$ | $B_6$ | *—CONH— | (4,3') | yellow |
| 67 | $T_1$ | $B_7$ | *—CONH— | (4,3') | yellow |

-continued

| Ex. | T | B | $X_o$ | position of $X_o$ on ring D and ring $D_1$ | Shade of the dyeing |
|---|---|---|---|---|---|
| 68 | $T_4$ | $B_7$ | *—CONH— | (4,3') | yellow |
| 69 | $T_1$ | $B_6$ | —CH$_2$—CH$_2$— | (4,3') | yellow |
| 70 | $T_4$ | $B_6$ | —CH$_2$—CH$_2$— | (4,3') | yellow |
| 71 | $T_1$ | $B_7$ | —CH$_2$—CH$_2$— | (4,3') | yellow |
| 72 | $T_4$ | $B_7$ | —CH$_2$—CH$_2$— | (4,3') | yellow |
| 73 | $T_1$ | $B_6$ | —CONHCH$_2$CHOHCH$_2$NHCO— | (4,4') | yellow |
| 74 | $T_4$ | $B_6$ | —CONHCH$_2$CHOHCH$_2$NHCO— | (4,4') | yellow |
| 75 | $T_1$ | $B_7$ | —CONHCH$_2$CHOHCH$_2$NHCO— | (4,4') | yellow |
| 76 | $T_4$ | $B_7$ | —CONHCH$_2$CHOHCH$_2$NHCO— | (4,4') | yellow |
| 77 | $T_4$ | $B_6$ | —CH$_2$— | (4,4') | yellow |
| 78 | $T_4$ | $B_7$ | —CH$_2$— | (4,4') | yellow |
| 79 | $T_1$ | $B_6$ | —CO—NHCH$_2$CH$_2$NH—CO— | (4,4') | yellow |
| 80 | $T_4$ | $B_6$ | —CO—NHCH$_2$CH$_2$NH—CO— | (4,4') | yellow |
| 81 | $T_1$ | $B_7$ | —CO—NHCH$_2$CH$_2$NH—CO— | (4,4') | yellow |
| 82 | $T_4$ | $B_7$ | —CO—NHCH$_2$CH$_2$NH—CO— | (4,4') | yellow |
| 83 | $T_1$ | $B_2$ | —CONH—CH$_2$—CH(CH$_3$)—NHCO— | (3,3') | yellow |
| 84 | $T_1$ | $B_5$ | —CONH—CH$_2$—CH(CH$_3$)—NHCO— | (3,3') | yellow |
| 85 | $T_1$ | $B_7$ | —CONH—CH$_2$—CH(CH$_3$)—NHCO— | (3,3') | yellow |
| 86 | $T_1$ | $B_6$ | —CONH—CH$_2$—CH(CH$_3$)—NHCO— | (3,3') | yellow |

EXAMPLE 87

By following the procedure disclosed in Example 1 but using 4,4'-diamino-2,2'-dimethoxydiphenylmethane instead of 4,4'-diaminodiphenylmethane, the following dyestuff is obtained.

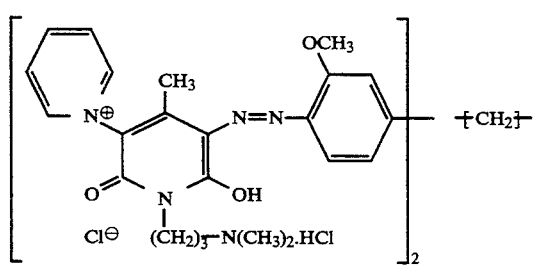

It has a high solubility in water and gives orange dyeings with good fastness properties.

Compounds of the formula

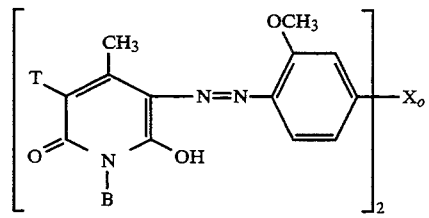

in which the symbols are defined in Table II below can be produced by an analogous method to that of Example 1 from appropriate reactants.

TABLE II

| Ex. | T | B | $X_o$ | shade of the dyeing |
|---|---|---|---|---|
| 88 | $T_1$ | $B_1$ | —CH$_2$— | yellow |
| 89 | $T_1$ | $B_2$ | " | " |
| 90 | $T_1$ | $B_4$ | " | " |
| 91 | $T_1$ | $B_5$ | " | " |
| 92 | $T_1$ | $B_6$ | " | " |
| 93 | $T_1$ | $B_7$ | " | " |
| 94 | $T_4$ | $B_3$ | " | orange |
| 95 | $T_4$ | $B_5$ | " | " |
| 96 | $T_4$ | $B_6$ | " | " |
| 97 | $T_4$ | $B_7$ | " | " |

EXAMPLES 98 TO 106

Compounds of the formula

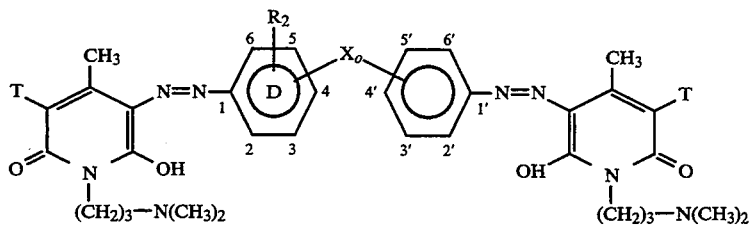

in which the symbols T, $X_o$ and $R_2$ are defined in Table III below, can be produced in accordance with the procedure described in Example 1.

TABLE III

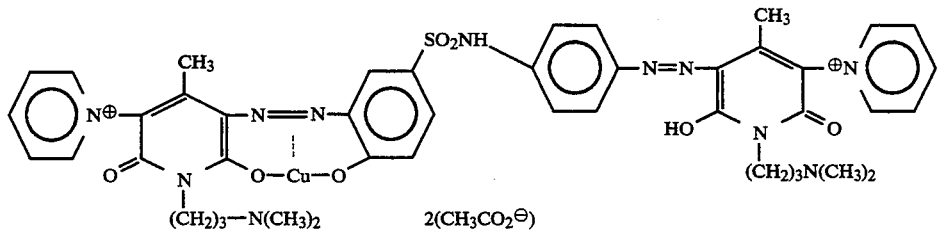

| Ex. | T | $R_2$ | position of $R_2$ | $X_o$ | position of $X_o$ on ring D and $D_1$ |
|---|---|---|---|---|---|
| 98 | $T_1$ | —OH | 2 | *—SO$_2$NH— | 3,4' |
| 99 | $T_3$ | " | " | " | " |
| 100 | $T_4$ | " | " | " | " |
| 101 | $T_5$ | " | " | " | " |
| 102 | $T_1$ | " | " | " | 4,4' |
| 103 | $T_4$ | " | " | " | " |
| 104 | $T_1$ | —NO$_2$ | 3 | —S— | " |
| 105 | $T_4$ | " | " | " | " |
| 106 | $T_4$ | —COOH | 3 | " | " |

The compounds of Examples 104 and 105 give yellow dyeings, the compounds of Examples 98 to 103 give a brown shade and the compound of Example 106 gives orange dyeings. * The asterisked S atom is attached to phenyl ring D.

EXAMPLE 107

16.5 Parts of the compound of Example 100 are introduced into 200 parts of water with stirring and the mixture is heated to 60°. After addition of 5.2 parts copper sulphate pentahydrate and 4 parts sodium acetate, the resulting mixture i s heated to 80° and kept at this temperature for 7 hours. The resulting red solution is cooled to room temperature and, after addition of a solution of 45 parts sodium carbonate dissolved in 200 parts water, the precipitated reaction product is filtered and dried. The following dyestuff is obtained in powdered form. It dyes paper in a yellow-brown shade and the resulting dyeings have good light and wet-fastness properties.

EXAMPLE 108

By following the procedure of Example 107 but using the disazo compound of Example 103 the corresponding 1:1 copper complex is obtained.

EXAMPLE 109

16.5 Parts of the compound of Example 103 are introduced in 200 parts water with stirring and the mixture is heated to 60°. After addition of 5 parts potassium chromium (III) sulphate. 12H$_2$O and 7 parts sodium acetate (cryst.), the mixture is heated to 93°-95°. The chromation is complete after 4 to 5 hours reaction at this temperature. The resulting mixture is cooled to room temperature after which 50 parts sodium carbonate dissolved in 250 parts water are added to the mixture. The precipitated reaction product is then filtered and dried. The dyestuff of the formula

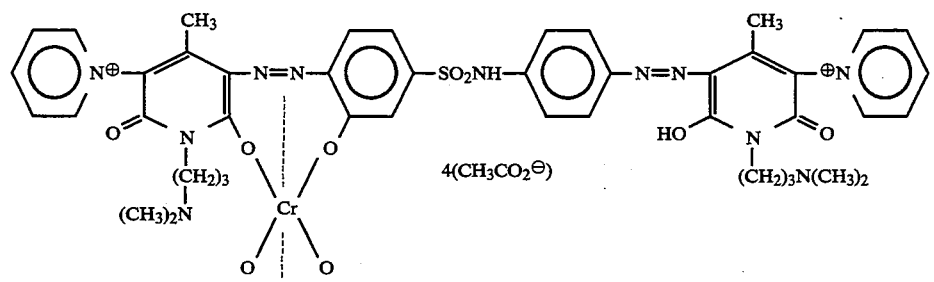

-continued

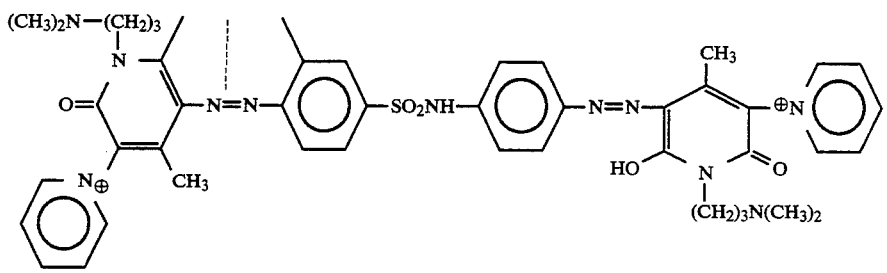

is obtained as a powder. When used in acid addition salt form, it dyes paper in a red-brown shade and the resulting dyeings have good light and wet fastness properties. The resulting waste water of the dyeings is practically colourless.

EXAMPLES 110 TO 114

By repeating the procedure of Example 109, but using the appropriate compounds, the following metal complexes are obtained.

TABLE III

| Ex. | Metal Complex | Coordinates |
| --- | --- | --- |
| 110 | 1:2 Cr | Compound of Example 100 |
| 111 | 1:2 Co | Compound of Example 100 |
| 112 | 1:2 Fe | Compound of Example 100 |
| 113 | 1:2 Co | Compound of Example 103 |
| 114 | 1:2 Fe | Compound of Example 103 |

The compounds of Examples 110 to 114 dye paper in a brown shade,

EXAMPLES 115 AND 116

Compounds of the formula

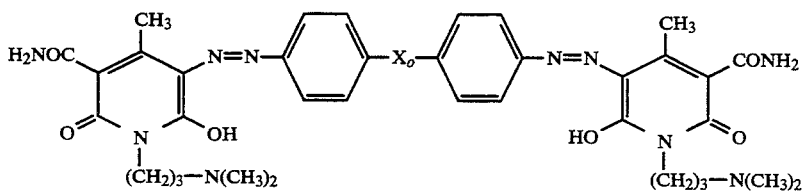

wherein $X_o$ is —O—CH$_2$—O— or

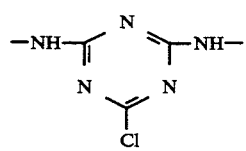

can be produced by a method analogous to that of Example 1 from appropriate reactants.

Application Example A

70 Parts of chemically bleached sulphite cellulose obtained from pinewood and 30 parts of chemically bleached sulphite cellulose obtained from birchwood are ground in 2000 parts of water in a Hollander. 0.2 Parts of the dyestuff of Example 1 in acid addition salt form are added into this pulp. Paper is produced from this pulp after mixing for 20 minutes. The absorbent paper which is obtained in this manner is dyed in a yellow tone and the waste water is practically colourless.

Application Example B 0.5 Parts of the dyestuff of Example 1 in acid addition salt form are added to 100 parts of chemically bleached sulphite cellulose which have been ground in a Hollander with 2000 parts of water. Sizing takes place after a thorough mixing for 15 minutes. The paper which is produced from this material has a yellow tone and has good wet fastness properties.

Application Example C

An absorbent web of unsized paper is drawn at a temperature of 40° to 50° through a dye solution having the following composition:

0.5 parts of the dyestuff of Example 1 (in acid addition salt form)
0.5 parts of starch
99.0 parts of water.

The dyebath excess is squeezed out through two rollers. The dried web of paper is dyed in a yellow tone and has good fastness properties.

Any of the dyes of Examples 2 to 116 may be used either in water-soluble salt form or in the form of a dye preparation, e.g. a granulate, in Application Examples A to C.

Application Example D

100 Parts of freshly tanned and neutralized chrome leather are agitated for 30 minutes in a vessel with a dyebath of 250 parts of water and 1 part of the dyestuff of Example 1 (in acid addition salt form) at 55° C. and are then treated in the same bath for 30 minutes with 2 parts of an anionic fatty liquor based on sulphonated train oil. The leather is then dried and prepared in the normal way, giving a leather evenly dyed in a yellow tone.

Other leathers can be similarly dyed by known methods.

Application Example E

2 Parts of the dyestuff of Example 1 (in acid addition salt form) are dissolved in 4000 parts of demineralised water at 40° C. 100 Parts of a prewetted cotton textile substrate are added and the bath is raised to boiling point over 30 minutes and held at the boil for 1 hour, topping up with water where necessary. After removing the dyed fabric from the bath, washing and drying, a yellow dyeing is obtained with good light fastness and wet fastness properties. The dyestuff exhausts practically totally and the waste water is practically colourless.

Any of the dyestuffs of Examples 2 to 116 may be used in place of that of Example 1 in Application Examples D and E.

Application Example F 15 kg waste paper, 25 kg bleached mechanical pulp and 10 kg unbleached sulphate cellulose are defibrated in a pulper into a 3% aqueous pulp slurry. This stock suspension is diluted to 2% in a dyeing chest. To this diluted suspension there are added first 5% by weight china clay and then 1,25 kg of a 5% acetic acid solution of the dyestuff of Example 1, the % being based on the dry weight of fibres. After 20 minutes, a 1% resin size dispersion (based on the weight of absolutely dry fibres) is added to the resulting pulp in the mixing chest. The homogeneous pulp slurry is then adjusted to pH 5 by addition of alum shortly before introduction into the paper machine.

A yellow 80 g/m² heavy bag paper is produced on the paper machine. The resulting dyed paper exhibits very good fastness properties to bleeding and good light fastness properties.

The resulting paper can almost completely be decolourized by hypochlorite. The residual dyestuff concentration in the waste liquor is substantially low.

Application Example G

Water is added to a dry pulp in a hollander consisting of 60% by weight of mechanical wood pulp and 40% by weight of unbleached sulphite cellulose and the slurry is beaten in order So obtain a dry content slightly exceeding 2.5% and having a beating degree of 40 SR. The slurry is then exactly adjusted to a high density dry content of 2.5%.

5 Parts of a 0.25% aqueous solution of the dyestuff of Example 1 are added to 200 parts of the above resulting slurry. The mixture is stirred for about 5 minutes and, after addition of 2% by weight resin size and then 4% by weight alum (based on the dry weight) is further stirred for a few minutes until homogeneous. The resulting pulp is diluted with about 500 parts water to a volume of 700 parts and then used for the production of sheets by suction on a sheet former. The resulting paper sheets are dyed in an intense yellow shade. The residual dyestuff concentration in the waste water from the sheet former has been measured photometrically ($\lambda_{max}$=448 nm) and is substantially low.

Any one of the dyestuffs of Examples 2 to 116 may be used in place of that of Example 1 in Application Examples F and G. The waste water exhibits a substantially low residual dyestuff concentration.

What is claimed is:

1. In a process for producing colored paper comprising the steps of incorporating a dye into paper pulp and producing paper from said paper pulp or the step of applying a dye to paper sheet, the improvement wherein said dye is a compound of the formula

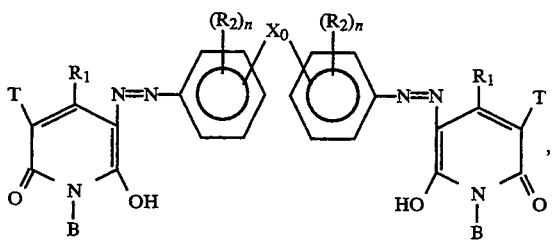

or an acid addition salt thereof, wherein each B is $-A_1-NR_7R_8$ or $-A_1-{}^{\oplus}NR_7R_8R_9\ A^{\ominus}$, to two B's being identical, wherein each $A_1$ is linear or branched $C_{2-8}$alkylene, each $R_7$ is $C_{1-6}$alkyl; $C_{2-6}$alkyl monosubstituted by halo, hydroxy or cyano; phenyl($C_{1-3}$alkyl); phenyl($C_{1-3}$alkyl) the phenyl ring of which is substituted by 1 to 3 substituents selected from halo, $C_{1-4}$alkyl and $C_{1-4}$alkoxy; $C_{5-6}$cycloalkyl or $C_{5-6}$cycloalkyl substituted by 1 to 3 $C_{1-4}$alkyl groups, each $R_8$ is $C_{1-6}$alkyl; $C_{2-6}$alkyl monosubstituted by halo, hydroxy or cyano; phenyl($C_{1-3}$alkyl); phenyl($C_{1-3}$alkyl) the phenyl ring of which is substituted by 1 to 3 substituents selected from halo, $C_{1-4}$alkyl and $C_{1-4}$alkoxy; $C_{5-6}$cycloalkyl or $C_{5-6}$cycloalkyl substituted by 1 to 3 $C_{1-4}$alkyl groups, and each $R_9$ is $C_{1-4}$alkyl; phenyl($C_{1-4}$alkyl); 2-oxopropyl; carbamoylmethyl or 3-chloro-2-hydroxypropyl, or each $-NR_7R_8$ is an unsubstituted saturated ring containing 1 to 3 hetero atoms, a saturated ring containing 1 to 3 hetero atoms and substituted by 1 to 3 $C_{1-4}$alkyl groups or N'-aminoethylpiperazino, or each $-{}^{\oplus}NR_7R_8R_9$ is pyridinium, pyridinium substituted by 1 to 3 $C_{1-4}$alkyl groups, an unsubstituted saturated ring containing 1 to 3 hetero atoms, a saturated ring containing 1 to 3 hetero atoms and substituted by 1 to 3 $C_{1-4}$alkyl groups or N—$C_{1-2}$alkyl-N'-aminoethylpiperazinium, each $R_1$ is hydrogen, $C_{1-4}$alkyl, $C_{5-6}$cycloalkyl, phenyl, benzyl or phenylethyl, the two $R_1$'s being identical, each $R_2$ is independently halo, nitro, carboxy, $C_{1-4}$alkyl or $C_{1-4}$alkoxy, each T is hydrogen or

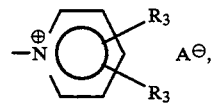

the two T's being identical, wherein each $R_3$ is independently hydrogen, $C_{1-4}$alkyl, $-N(R_5)_2$ or $-CON(R_5)_2$, wherein each $R_5$ is independently hydrogen or $C_{1-4}$alkyl, or $-N(R_5)_2$ is an unsubstituted saturated ring containing 1 to 3 hetero atoms or a saturated ring containing 1 to 3 hetero atoms and substituted by 1 to 3 $C_{1-4}$alkyl groups, $X_o$ is a direct bond, linear or branched $C_{1-4}$alkylene,

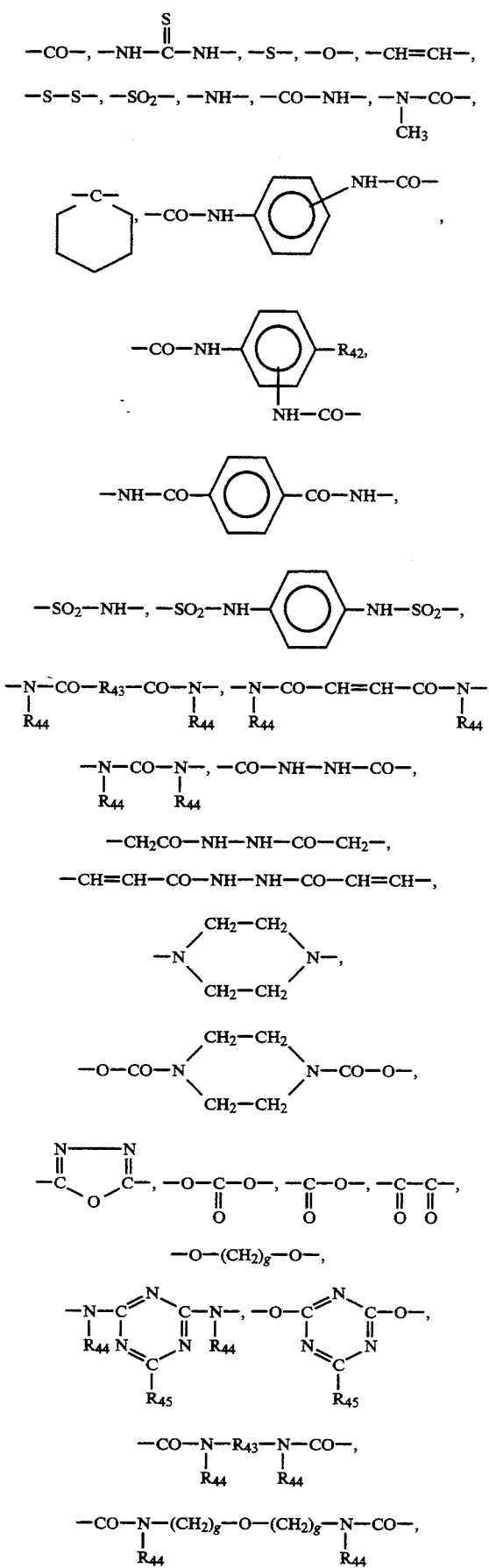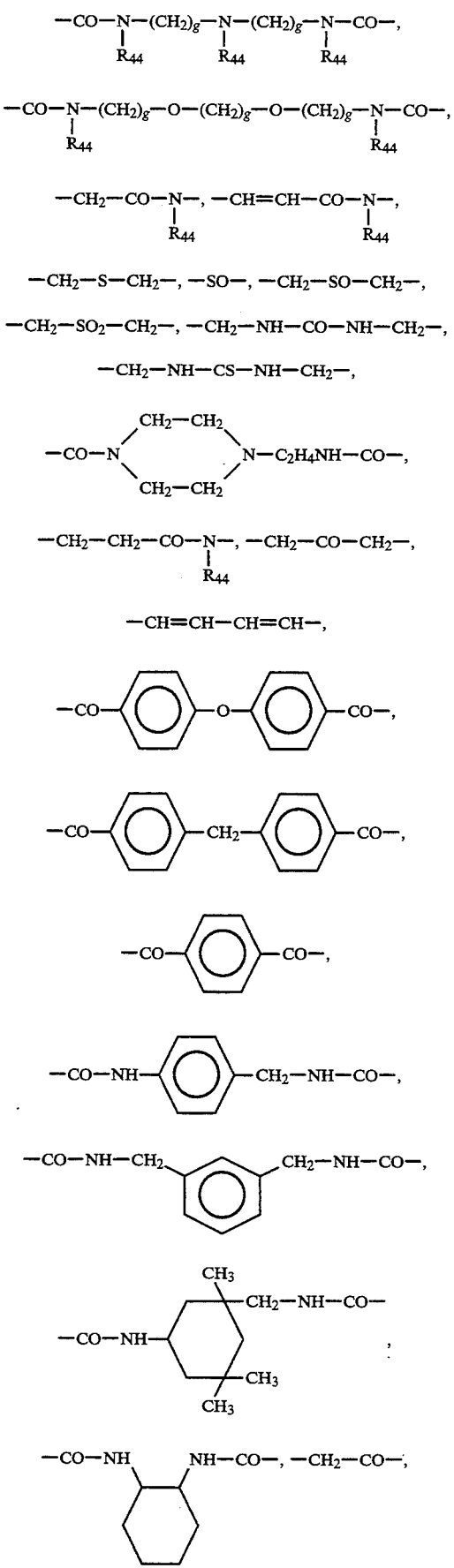

-continued

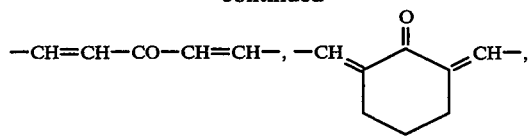

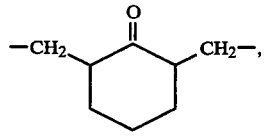

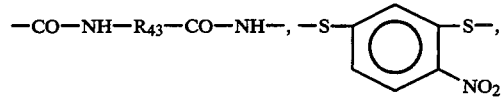

—CO—NH—R₄₃—CO—NH—R₄₃—NH—CO—,

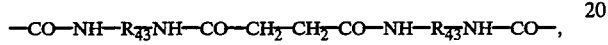

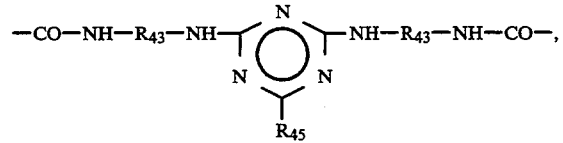

—SO₂—NR₄₄—(CH₂)_g—NR₄₄—SO₂—,

—CO—NR₄₄—R₄₃—O—CO—,

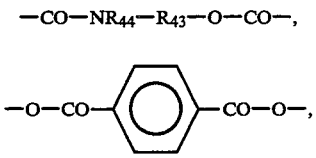

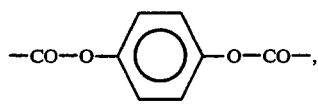

—CONH—R₄₃—NH—CO—NH—R₄₃—NH—CO— or

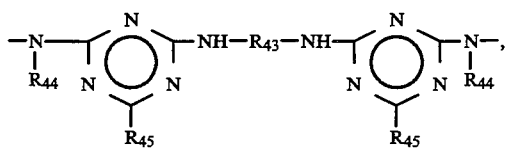

with the proviso that when at least one n is 1 or 2, $X_o$ is a direct bond, linear or branched $C_{1-4}$alkylene,

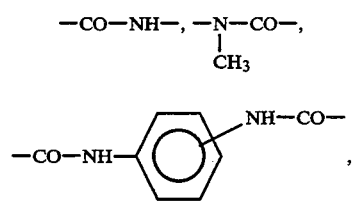

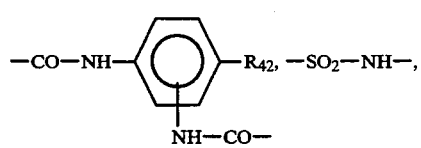

-continued

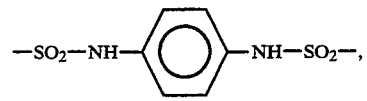

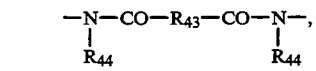

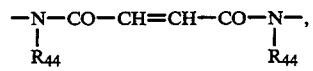

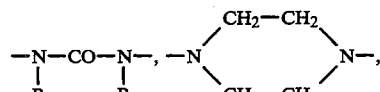

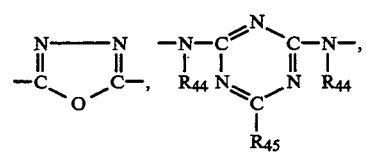

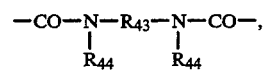

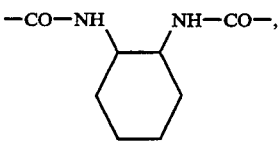

—CO—NH—R₄₃—CO—NH— or

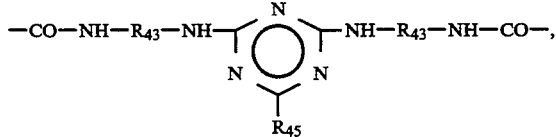

wherein $R_{42}$ is halo, $C_{1-4}$alkyl or $C_{1-4}$alkoxy, each $R_{43}$ is independently linear or branched $C_{1-4}$alkylene,

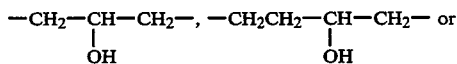

each $R_{44}$ is independently hydrogen or $C_{1-4}$alkyl,
each $R_{45}$ is independently halo, hydroxy, methoxy, ethoxy, amino, 2-hydroxyethylamino, N,N-di-(2-hydroxyethyl)amino, —NH—(CH₂)ₘ—N(C₂H₅)₂, N-methyl-N-phenylamino, N-cyclohexyl-N-methylamino, piperidino or N'-aminoethylpiperazino, wherein m is 2 or 3, and
each g is independently 1, 2, 3 or 4, and each n is independently 0, 1 or 2,
wherein each A⊖ is a non-chromophoric anion, and each halo is fluoro, chloro, bromo or iodo.

2. A process according to claim 1 wherein the dye is a compound of the formula

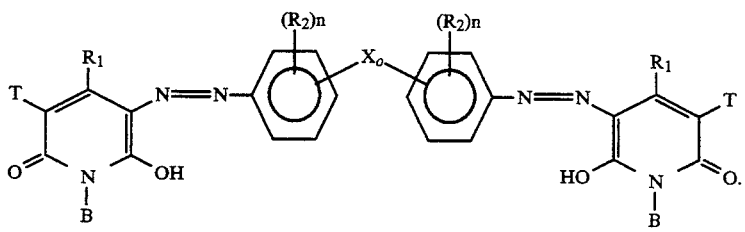

3. A process according to claim 1 wherein the dye is an acid addition salt of a compound of the formula

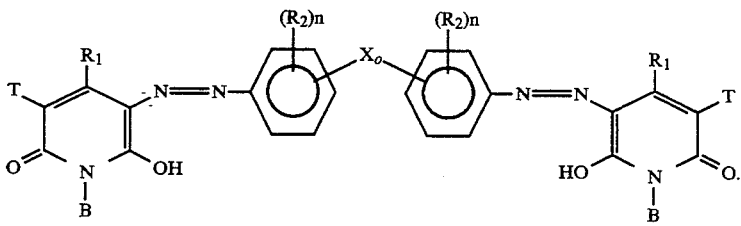

4. A process according to claim 1, or an acid addition salt thereof, wherein X is other than a direct bond, linear or branched $C_{1-4}$alkylene, —CO—, —S—, —O—, —SO$_2$—,

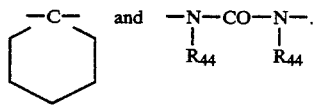 and 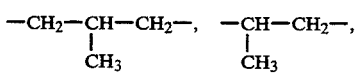

5. A process according to claim 1 wherein the dye is a compound of the formula

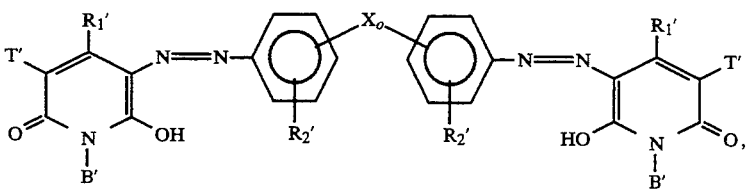

or an acid addition salt thereof,
wherein each B' is —A$_1$'—NR$_7$'R$_8$' or —A$_1$'—⊕NR$_7$'R$_8$'R$_9$' A⊖, the two B''s being identical, wherein each A$_1$' is —(CH$_2$)$_2$—, —(CH$_2$)$_3$—, —(CH$_2$)$_4$—, —CH$_2$—CH—CH$_2$—,   —CH—CH$_2$—,
     |                     |
     CH$_3$                 CH$_3$ —CH—CH$_2$CH$_2$—  or  —CH—,
 |                       |
 CH$_3$                   CH$_3$ each R$_7$' is $C_{1-6}$alkyl, n—$C_{2-3}$hydroxyalkyl, benzyl, 2-chloroethyl or 2-cyanoethyl,
each R$_8$' is $C_{1-6}$alkyl n—$C_{2-3}$hydroxyalkyl, benzyl, 2-chloroethyl or 2-cyanoethyl, and
each R$_9$' is methyl, ethyl, propyl or benzyl, or
—NR$_7$'R$_8$' is pyrrolidino, piperidino, morpholino, piperazino, N'-methylpiperazino or N'-aminoethylpiperazino, or —⊕NR$_7$'R$_8$'R$_9$' is pyridinium pyridinium substituted by 1 or 2 methyl groups or

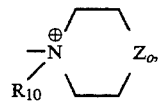

wherein Z$_0$ is a direct bond,

—CH$_2$—, —O—, —S—, —SO—, —SO$_2$—, —NH—, —NR$_{10}$—,

—⊕N(R$_{10}$)$_2$— A⊖  or  —N—C$_2$H$_4$NH$_2$,
                           | each R$_1$' is methyl, ethyl, phenyl, benzyl or cyclohexyl, the two R$_1$' is being identical,
each R$_2$' is independently hydrogen, methyl, ethyl, methoxy, ethoxy, chloro or bromo, and
each T' is hydrogen or

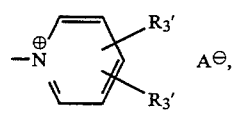

the two T''s being identical,
wherein each R$_3$' is independently hydrogen, methyl, ethyl, amino or dimethylamino, and
each R$_5$' is independently hydrogen, methyl or ethyl, or
—N(R$_5$')$_2$ is pyrrolidino, piperidino, morpholino, piperazino or N'-methylpiperazino,
wherein each R$_{10}$ is independently methyl or ethyl.

6. A process according to claim 5 wherein the dye is a compound of the formula

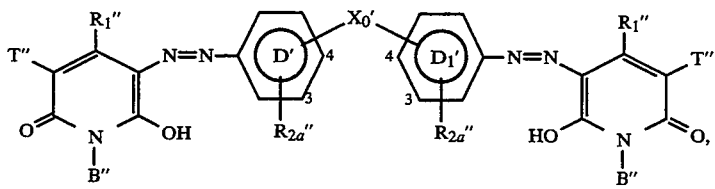

or an acid addition salt thereof, wherein each B″ is —(CH$_2$)$_2$—NR$_7$″R$_8$″, —(CH$_2$)$_3$—NR$_7$″R$_8$″, —(CH$_2$)$_2$—⊕NR$_7$″R$_8$″R$_9$″ A⊖ or —(CH$_2$)$_3$—⊕NR$_7$″R$_8$″R$_9$″ A⊖, the two B″'s being identical, wherein each R$_7$″ is methyl or ethyl,
each R$_8$″ is methyl or ethyl, and
each R$_9$″ is methyl, ethyl or benzyl, or
—NR$_7$″R$_8$″ is piperidino, morpholino, piperazino, N′-methylpiperazino or N′-aminoethylpiperazino, or
—⊕NR$_7$″R$_8$″R$_9$″ is pyridinium, 2-picolinium, 3-picolinium, N-methylpiperidinium, N-methylmorpholinium, N-methylpiperazinium, N,N′-dimethylpiperazinium, N-methyl-N′-(2-aminoethyl)piperazinium or N,N′,N′-trimethylpiperazinium A⊖, each R$_1$″ is methyl or phenyl, the two R$_1$″'s being identical,
each R$_{2a}$″ is independently hydrogen, methyl, methoxy or chloro,
each T″ is hydrogen or

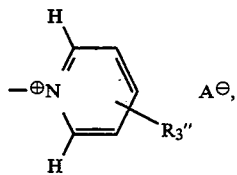

the two T″'s being identical,
wherein R$_3$″ is hydrogen or methyl, and X$_o$′, when each R$_{2a}$″ is hydrogen, is a direct bond,

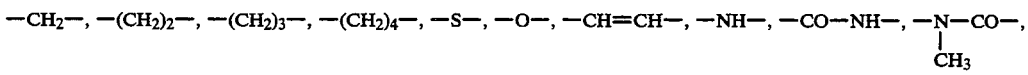

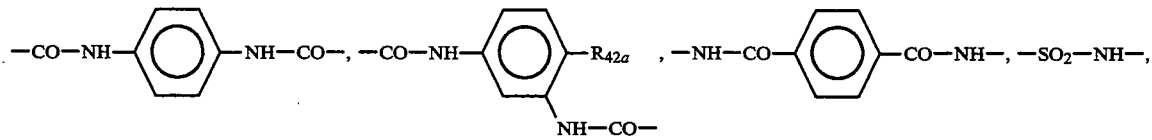

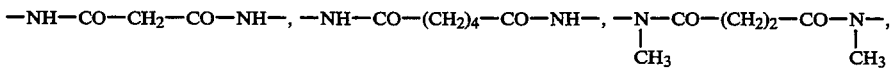

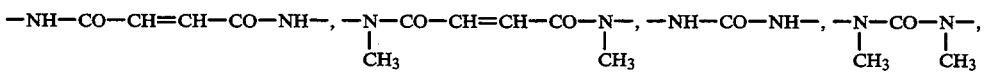

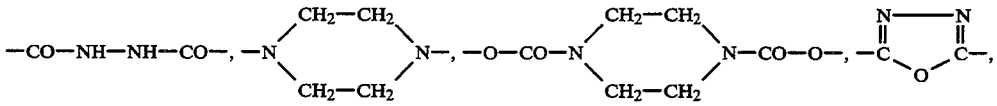

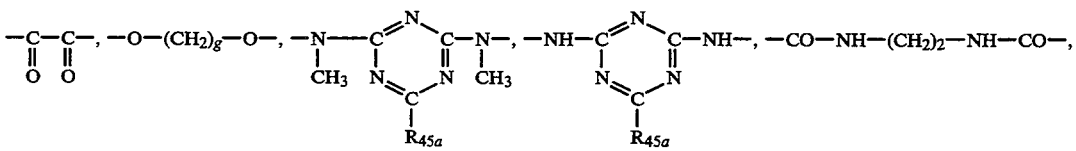

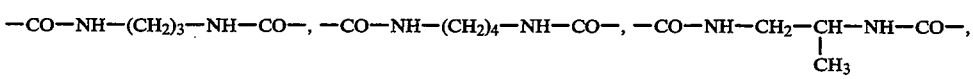

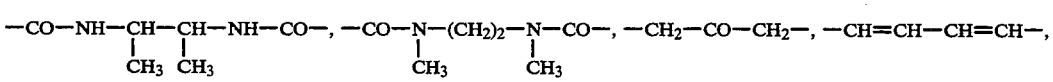

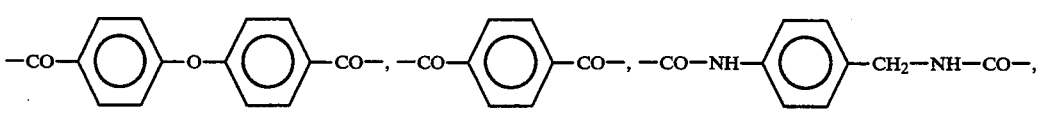

-continued

—CH₂—CO—, —CH=CH—CO—CH=CH—, —CO—NH—R₄₃—CO—NH—,

—CO—NH—(CH₂)$_p$—NH—CO—(CH₂)₂—CO—NH—(CH₂)$_p$—NH—CO—,

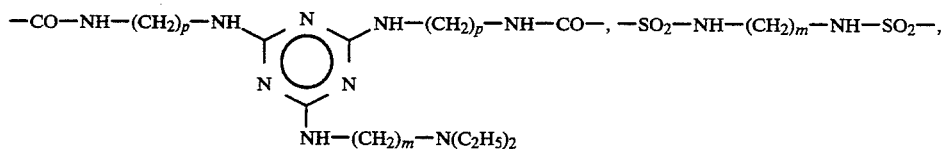

—CO—NH—(CH₂)$_t$—NH—CO—NH—(CH₂)$_t$—NH—CO— or

and, when at least one R₂$_a$″ is other than hydrogen, is a direct bond, —CH₂—, —(CH₂)₂—, —(CH₂)₃—, —CO—NH—

$$-\underset{CH_3}{N}-CO-,\ -SO_2-NH-,$$

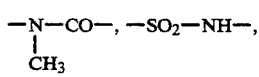

—NH—CO—CH=CH—CO—NH—,

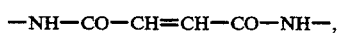

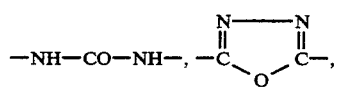

—CO—NH—(CH₂)₂—NH—CO—,
—CO—NH—(CH₂)₃—NH—CO—, $$-CO-NH-CH_2-\underset{CH_3}{\overset{|}{CH}}-NH-CO-,$$

$$-CO-\underset{CH_3}{\overset{|}{N}}-(CH_2)_2-\underset{CH_3}{\overset{|}{N}}-CO-,$$

—CO—NH—R₄₃—CO—NH— or

-continued

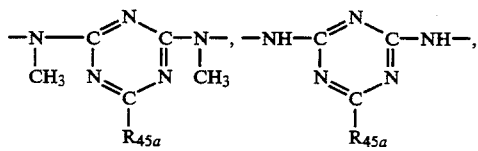

wherein R₄₂$_a$ is hydrogen, chloro, methyl or methoxy,

R₄₅$_a$ is chloro, hydroxy, methoxy, ethoxy, amino, 2-hydroxyethylamino, N,N-di-(2-hydroxyethyl)amino, 3-(N,N-diethylamino)propylamino, N-methyl-N-phenylamino, N-cyclohexyl-N-methylamino, piperidino or N′-aminoethylpiperazino, m is 2 or 3,
each p is 1 or 2, and
each t is 1, 2 or 3,
with the proviso that X$_o$ is attached to the 3- or 4-position of Ring D′ and to the 3- or 4-position of Ring D₁′.

7. A process according to claim 6 wherein the dye is a compound of the formula

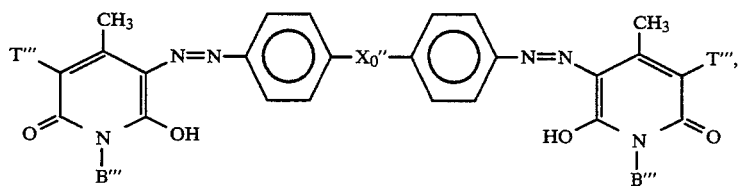

or an acid addition salt thereof,
wherein each is —(CH₂)₂—K or —(CH₂)₃—K, the two B′′′′'s being identical,
wherein each K is dimethylamino, diethylamino, morpholino, piperazino, N′-aminoethylpiperazino, trimethylammonium A⊖, diethylmethylammonium A⊖, pyridinium A⊖, 3-picolinium A⊖, N-methylmorpholinium A⊖, N-methyl-N′-aminoethylpiperazinium A⊖ or N,N′,N′-trimethylpiperazinium 2A⊖,
each T′′′′ is hydrogen

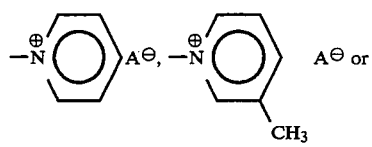
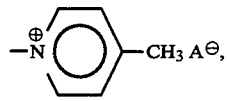
the two T''''s being identical, and
$X_o''$ is a direct bond, —CH$_2$—, —(CH$_2$)$_2$—, —CO—NH—,
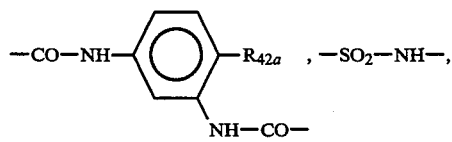
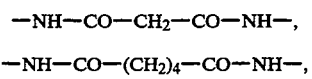
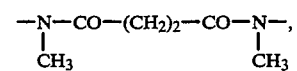
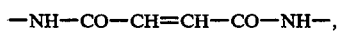
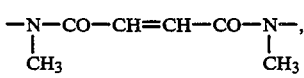
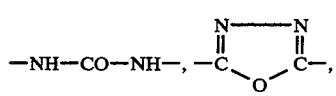
-continued
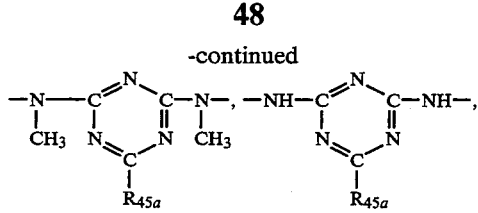
—CO—NH—(CH$_2$)$_2$—NH—CO—,
—CO—NH—(CH$_2$)$_3$—NH—CO—,
—CO—NH—(CH$_2$)$_4$—NH—CO—,
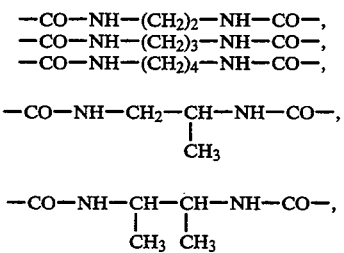
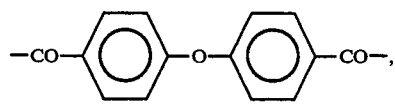
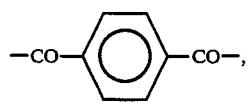
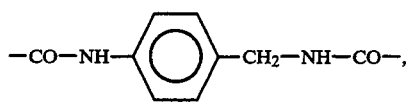
—CO—NH—R$_{43}$—CO—NH— or
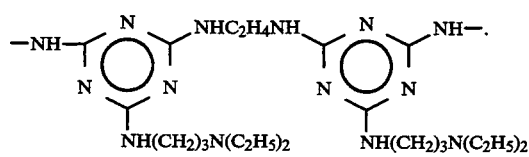
8. A process according to claim 7 wherein the dye is a compound of the formula
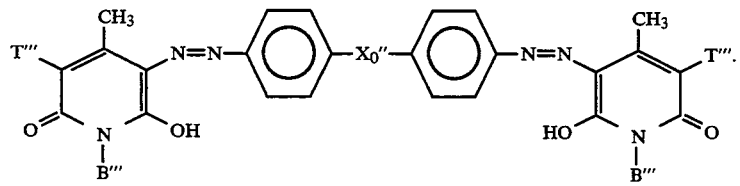
9. A process according to claim 7 wherein the dye is an acid addition salt of a compound of the formula
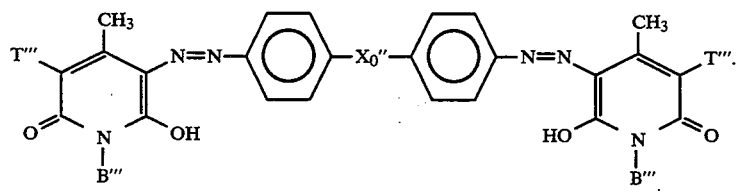

10. A process according to claim 5 wherein the dye is a compound of the formula

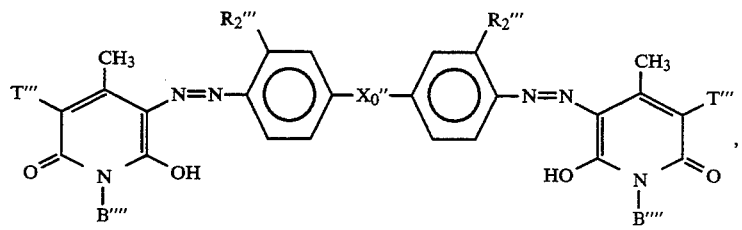

or an acid addition salt thereof,
wherein each B'''' is —(CH$_2$)$_2$—K' or —(CH$_2$)$_3$—K', the two B''''s being identical,
wherein each K' is dimethylamino or diethylamino,
each R$_2$''' is independently hydrogen, methoxy or ethoxy,
each T''' is hydrogen

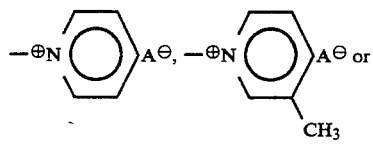

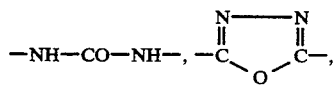

the two T'''s being identical, and
X$_o$'', when each R$_2$''' is hydrogen, is a direct bond,

—CH$_2$—, —(CH$_2$)$_2$—, —CO—NH—

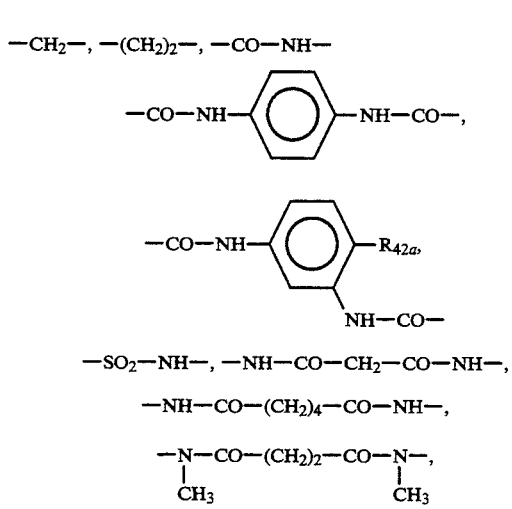

—SO$_2$—NH—, —NH—CO—CH$_2$—CO—NH—,

—NH—CO—(CH$_2$)$_4$—CO—NH—, $$-\underset{CH_3}{N}-CO-(CH_2)_2-CO-\underset{CH_3}{N}-,$$

—NH—CO—CH=CH—CO—NH—, $$-\underset{CH_3}{N}-CO-CH=CH-CO-\underset{CH_3}{N}-,$$

—NH—CO—NH—, 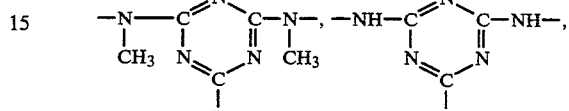

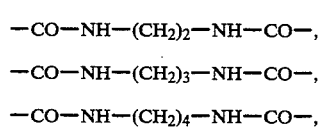

—CO—NH—(CH$_2$)$_2$—NH—CO—,

—CO—NH—(CH$_2$)$_3$—NH—CO—,

—CO—NH—(CH$_2$)$_4$—NH—CO—, $$-CO-NH-CH_2-\underset{CH_3}{CH}-NH-CO-,$$

$$-CO-NH-\underset{CH_3}{CH}-\underset{CH_3}{CH}-NH-CO-,$$

$$-CO-\underset{CH_3}{N}-(CH_2)_2-\underset{CH_3}{N}-CO-,$$

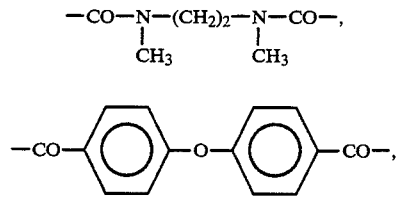

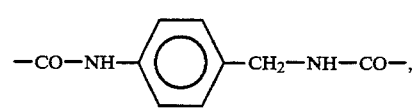

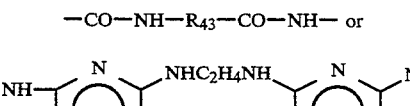

—CO—NH—R$_{43}$—CO—NH— or

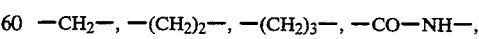

and, when at least one R$_2$''' is other than hydrogen, is

—CH$_2$—, —(CH$_2$)$_2$—, —(CH$_2$)$_3$—, —CO—NH—,

—SO$_2$—NH—, 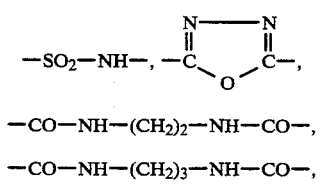

—CO—NH—(CH$_2$)$_2$—NH—CO—,

—CO—NH—(CH$_2$)$_3$—NH—CO—,

-continued

—CO—NH—CH₂—CH(CH₃)—NH—CO— or

—CO—NH—R₄₃—CO—NH—, wherein R₄₂ₐ is hydrogen, chloro, methyl or methoxy, and
R₄₅ₐ is chloro, hydroxy, methoxy, ethoxy, amino, 2-hydroxyethylamino, N,N-di(2-hydroxyethyl)amino, 3-(N,N-diethylamino)propylamino, N-methyl-N-phenylamino, N-cyclohexyl-N-methylamino, piperidino or N'-aminoethylpiperazino.

11. A process according to claim 10 wherein the dye is a compound of the formula

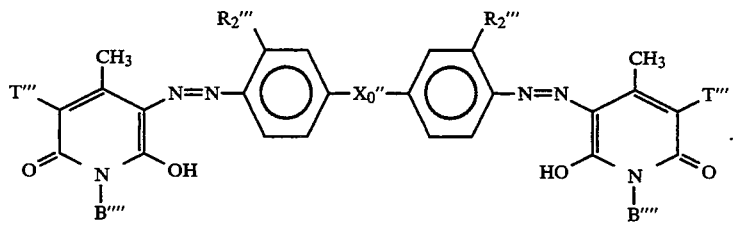

12. A process according to claim 10 wherein the dye is an acid addition salt of a compound of the formula

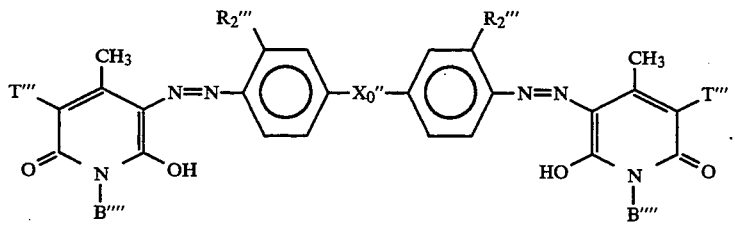

13. A process according to claim 10 wherein the dye is the compound of the formula

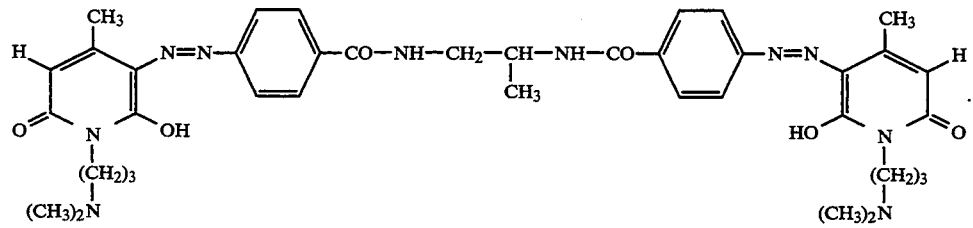

14. A process according to claim 10 wherein the dye is an acid addition salt of the compound of the formula

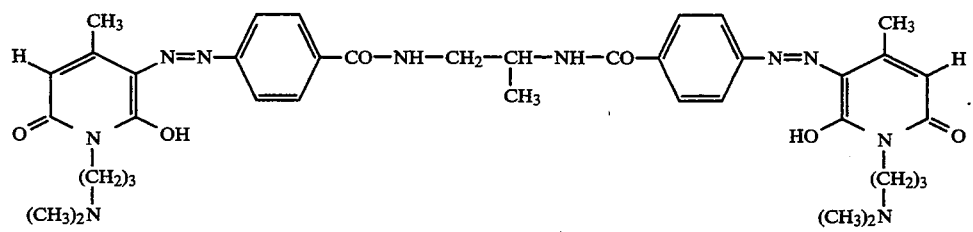

15. A process according to claim 10 wherein the dye is the compound of the formula

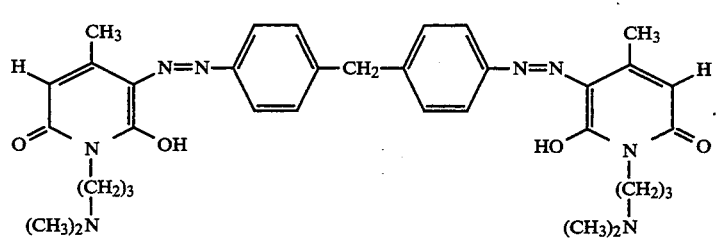

16. A process according to claim 10 wherein the dye is an acid addition salt of the compound of the formula

18. A process according to claim 10 wherein the dye is an acid addition salt of a compound of the formula

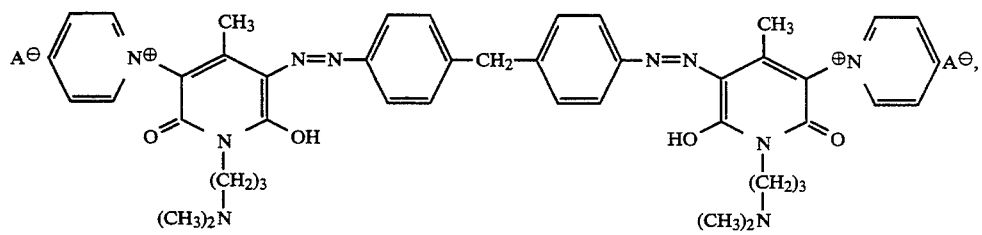

wherein each $A^{\ominus}$ is a non-chromophoric anion.

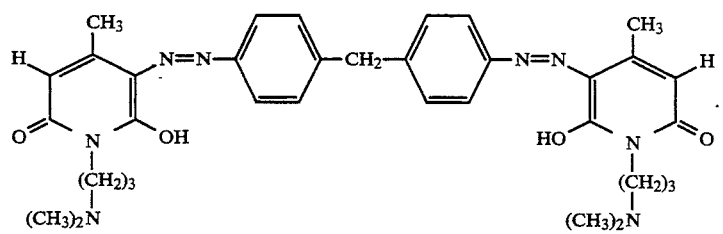

17. A process according to claim 10 wherein the dye is a compound of the formula

19. A process according to claim 17 wherein the dye is the compound of the formula

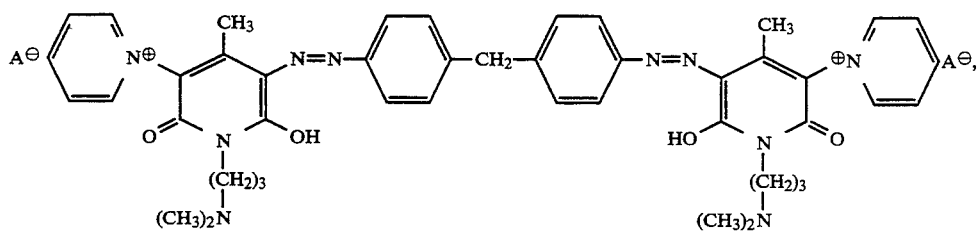

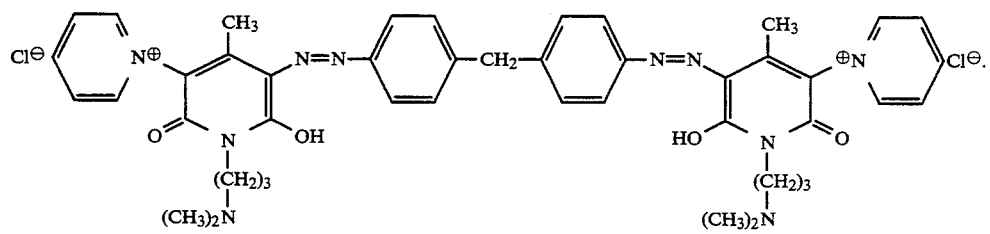

wherein each $A^{\ominus}$ is a non-chromophoric anion.

20. A process according to claim 18 wherein the dye is an acid addition salt of the compound of the formula

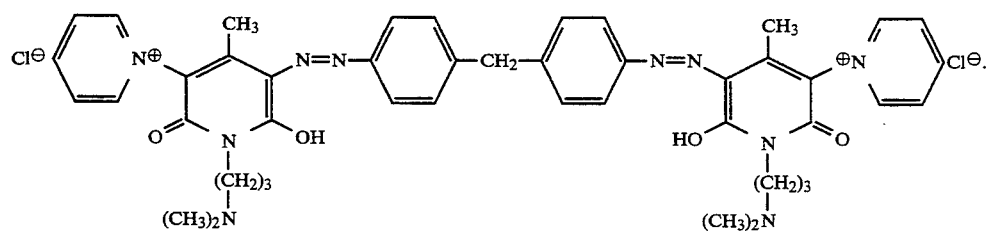

* * * * *